US008484236B1

(12) United States Patent
Andrews et al.

(10) Patent No.: US 8,484,236 B1
(45) Date of Patent: *Jul. 9, 2013

(54) METHOD AND/OR SYSTEM FOR PROCESSING DATA STREAMS

(75) Inventors: Mark Andrews, Orinda, CA (US); Richard Crandall, Portland, OR (US); Karl Schiffmann, Montecito, CA (US)

(73) Assignee: Robert T. Jenkins and Virginia T. Jenkins, Sacramento, CA (US), as Trustees for the Jenkins Family Trust ( * ) Notice: Subject to any disclaimer, the term of this patent is extended or adjusted under 35 U.S.C. 154(b) by 231 days.

This patent is subject to a terminal disclaimer.

(21) Appl. No.: 11/771,911

(22) Filed: Jun. 29, 2007

Related U.S. Application Data

(60) Provisional application No. 60/817,764, filed on Jun. 30, 2006.

(51) Int. Cl.
    *G06F 7/00* (2006.01)
    *G06F 17/30* (2006.01)
    *G06F 7/50* (2006.01)

(52) U.S. Cl.
    USPC ............ 707/763; 707/736; 707/713; 708/671

(58) Field of Classification Search
    USPC 707/3, 713, 736, 763; 708/212, 671; 711/135
    See application file for complete search history.

(56) References Cited

U.S. PATENT DOCUMENTS

| | | | |
|---|---|---|---|
| 4,053,871 A | 10/1977 | Vidalin et al. | |
| 4,443,860 A | 4/1984 | Vidalin | |
| 4,550,436 A | 10/1985 | Freeman et al. | |
| 5,073,864 A * | 12/1991 | Methvin et al. | 708/212 |
| 5,381,127 A | 1/1995 | Khieu | |
| 5,392,212 A | 2/1995 | Geist | |
| 5,465,374 A | 11/1995 | Dinkjian et al. | |
| 5,761,521 A | 6/1998 | Chilinski et al. | |
| 6,141,656 A * | 10/2000 | Ozbutun et al. | 707/3 |
| 6,279,080 B1 * | 8/2001 | DeRoo | 711/135 |
| 6,523,056 B1 | 2/2003 | Bole et al. | |
| 6,745,215 B2 | 6/2004 | Bera | |
| 8,073,893 B1 | 12/2011 | Crandall et al. | |

OTHER PUBLICATIONS

Patent Application in co-pending U.S. Appl. No. 11/509,420, filed Aug. 23, 2006, 70 pages.
Gill, "Machine and Assembly Language Programming of the PDP-11", Publisher: Prentice-Hall, Inc., Chapters 1 and 3, 1978, 19 pages.
U.S. Appl. No. 11/509,420: Request for Continued Examination, mailed Jul. 5, 2011, 4 pages.
U.S. Appl. No. 11/509,420: Notice of Allowance, mailed Jul. 22, 2011, 5 pages.
U.S. Appl. No. 11/509,420: Application as filed Aug. 23, 2006, 75 pages.

(Continued)

*Primary Examiner* — Ann Chempakaseril
(74) *Attorney, Agent, or Firm* — Berkeley Law & Technology Group, LLP

(57) ABSTRACT

Embodiments of methods, apparatuses, devices and/or systems for manipulating character expressions to determine relationships among such character expressions. In particular embodiments, a character expression may be represented as a concatenation of binary representations of individual characters in the character expression to provide a binary string. The binary string may then be processed by applying a binary arithmetic operator to provide a comparison.

77 Claims, 7 Drawing Sheets

OTHER PUBLICATIONS

U.S. Appl. No. 11/509,420: Pre-Exam Formalities Notice mailed Sep. 15, 2006, 2 pages.
U.S. Appl. No. 11/509,420: Applicant Response to Pre-Exam Formalities Notice as filed Nov. 30, 2006, 18 pages.
U.S. Appl. No. 11/509,420: Filing Receipt mailed Dec. 6, 2006, 3 pages.
U.S. Appl. No. 11/509,420: Non-Final Application mailed Oct. 12, 2010, 8 pages.
U.S. Appl. No. 11/509,420: Request for Reconsideration-After Non-Final Application, as filed Mar. 21, 2011, 31 pages.
U.S. Appl. No. 11/509,420: Notice of Allowance and Fees due as mailed Apr. 4, 2011, 6 pages.
U.S. Appl. No. 11/509,420: Issue Fee payment, mailed Oct. 21, 2011, 3 pages.
U.S. Appl. No. 11/509,420: Miscellaneous Communication to Applicant, mailed Oct. 31, 2011, 4 pages.
U.S. Appl. No. 11/509,420: Issue Notification, mailed Nov. 16, 2011, 1 page.
U.S. Appl. No. 13/290,956: Application as filed on Nov. 7, 2011, 97 pages.
U.S. Appl. No. 13/290,956: Filing Receipt, mailed Nov. 22, 2011, 3 pages.

* cited by examiner

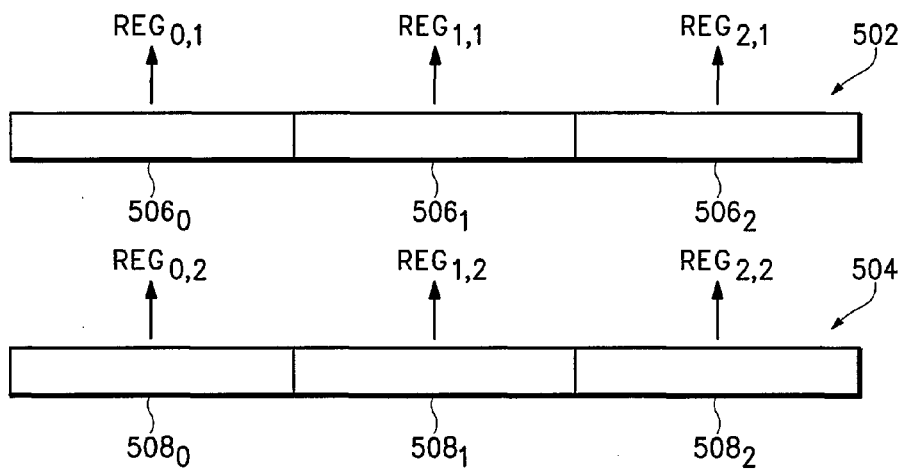
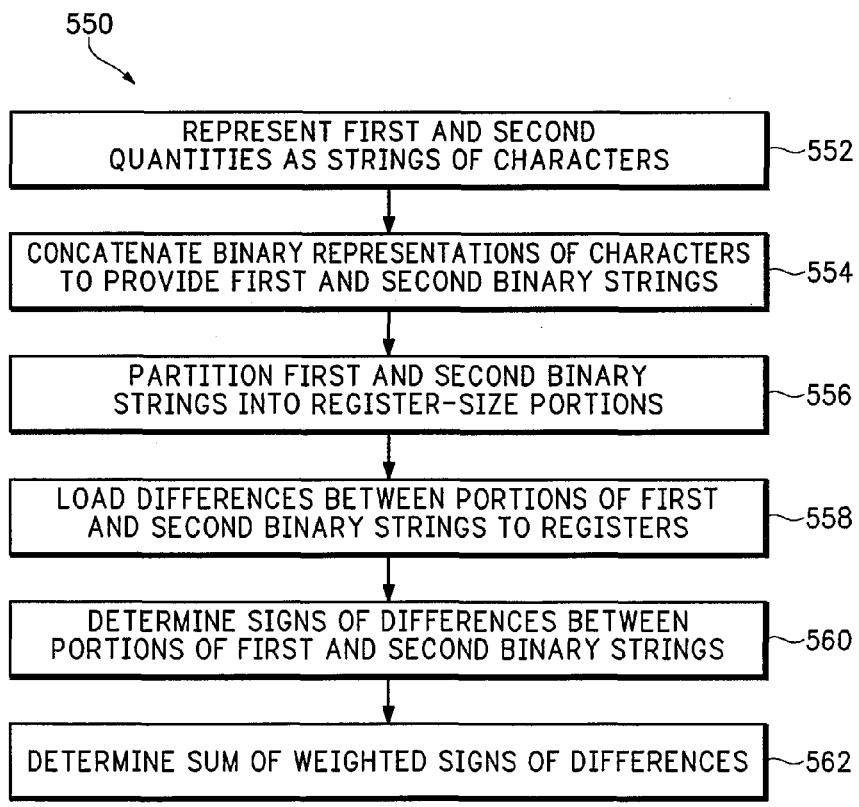
FIG.8
FIG.9

METHOD AND/OR SYSTEM FOR PROCESSING DATA STREAMS

CROSS-REFERENCE TO RELATED APPLICATIONS

This application claims the benefit of U.S. Provisional Application Ser. No. 60/817,764, filed on Jun. 30, 2006.

BACKGROUND

This disclosure is related to determining relationships between and/or among character expressions. Characters, such as alphanumeric characters, are typically used to represent information. In some examples, characters may be used to express words in a spoken and/or written language. In other examples, characters may be used to represent quantities. Computer systems typically represent quantities as binary expressions which may be stored in memory devices. This enables convenient manipulation of quantities using binary arithmetic through execution of computer instructions. Quantities may also be represented in strings of alphanumeric characters. For example, human interfaces typically express quantities in strings of alphanumeric characters. To compare quantities to determine, for example, an existence of an equality and/or inequality between and/or among quantities, a computer system typically expresses the quantities in question as binary expressions, and then compares the binary expressions.

Computer systems may be adapted to process queries of information which is stored and/or maintained in a particular format. The utility of a response to processing such queries typically depends on, among other things, timeliness of the response and qualities of information used to process such queries to obtain a response.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIG. 8 is a schematic diagram illustrating an a partitioning of binary strings into register sized portions; and FIG. 9 is a flow diagram illustrating a process to determine a relationship among character strings according to an alternative embodiment.

DETAILED DESCRIPTION

Figure 1:
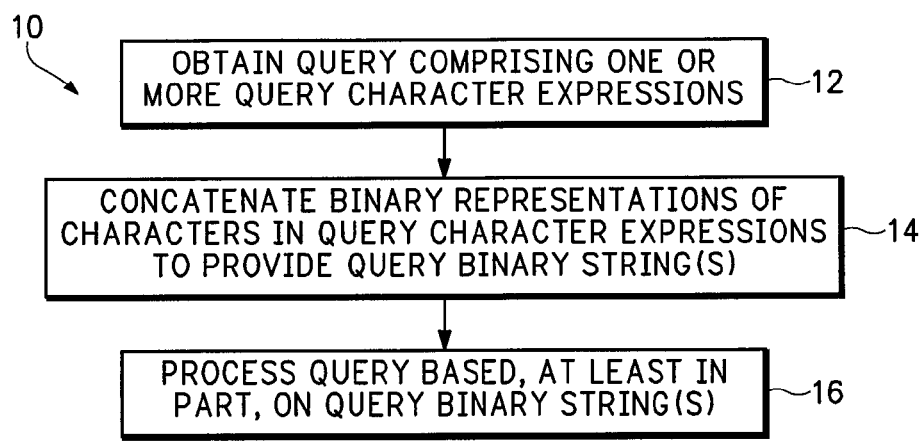
FIG. 1 is a flow diagram illustrating a process to respond to a query according to an embodiment.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, strings, expressions, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "loading", "subtracting", "concatenating", "transforming," "converting," "factoring," enumerating," "representing," "storing," "associating," "substituting," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices. Further, unless specifically stated otherwise, processes described herein, with reference to flow diagrams or otherwise, may also be executed and/or controlled, in whole or in part, by such a computing platform.

A "query" as referred to herein relates to a request for information. In a particular example, although claimed subject matter is not limited in these respects, a query may comprise a request for information from a particular "data source" which may express information in a predefined format. For example, a data source may comprise a database capable of maintaining information in format that is retrievable in response to a query. However, this merely an example of a data source and claimed subject matter is not limited in this respect. A query may be formatted according to a particular syntax as provided in a query language. Here, such a query may comprise, for example, operands, operators, relational operators and/or the like for expressing a request for information according to such a query language. However, these are merely examples of a query and claimed subject matter is not limited in these respects.

A query may be "processed" to provide a "query response" to a request for information. Here, a query may be processed by, for example, retrieval of information and processing of the retrieved information according to, for example one or more query operators. However, this is merely an example of how a query may be processed and claimed subject matter is not limited in these respects. A query response may comprise, for example, information requested by a query, an acknowledgement of receipt of the query and/or the like. In a particular example, a query response may comprise one or more Boolean results (e.g., "true" or "false") and/or information retrieved from a data source that is identified and/or requested in the processed query. It should be understood, however, that these are merely examples of responses to a query and claimed subject matter is not limited in these respects.

In real-time applications, utility of a response to a query may be affected by how quickly such a response is provided following issuance of the query. For example, information received in a timely response to a query may have more utility than information received in a delayed response to the query. Here, for example, information from a data source may be dynamic and change over time. Also, a timely response to a query enables the issuer of a query to act sooner on any information provided in such a timely response than would otherwise be possible on information received in a delayed response. The timeliness of a response to a query may be affected, at least in part, on an availability of processing resources for processing such a query. As illustrated below with reference to particular embodiments, timeliness of query processing may also be affected, at least in part, using specific techniques to process information provided in queries and/or information in data sources.

As indicated above, a query may comprise a request of information from one or more data sources. In a particular embodiment, although claimed subject matter is not limited in this respect, such a data source may comprise a static database, files and/or records that may be maintained on one or more mass storage devices. In alternative embodiments, a data source may comprise one or more "data streams" providing information that may change and/or be updated from time to time. As illustrated above, a query may be processed with information that is available to be used in connection with processing the query. A data stream may provide such available information over time. For example, query may be processed using information that is available at a first time. At a second time in the future, however, such a data stream may make additional and/or different information available for use in processing a query. However, these are merely examples of data sources and claimed subject matter is not limited in this respect.

A "character" as referred to herein relates to a symbol capable of being expressed in a medium. In a particular context, according to an embodiment, one or more characters may be arranged in a particular manner to express a particular meaning as a "character expression." For example, an arrangement of characters, such as a concatenation of characters in one particular embodiment, may be used to express words, acronyms and/or multi-character symbols in a particular spoken and/or written language. As explained below, such words formed according to the English language, in a particular example, may comprise "alphanumeric characters" selected from an alphabet of such characters. Also, an arrangement of characters may provide a mathematical expression such as numerals and/or equations. However, these are merely examples of character expressions and claimed subject matter is not limited in these respects.

According to an embodiment, a "string" as referred to herein comprises an array of symbols arranged in a single linear dimension. In particular examples, symbols in a string may be associated with particular positions in the string relating to, for example, a linear ordering of symbols. A string may comprise one or more of different types of symbols. In another particular example, an alphanumeric string or string of alphanumeric characters may comprise a linear array of alphanumeric characters (e.g., "0", "1", "2", "3", "a", "A", "b", "B", etc.) defined according to a character alphabet. In one particular example, such a character alphabet may comprise characters that are visually distinct and recognizable. In a particular context, and as illustrated below, an alphanumeric string may comprise a character expression to express particular meaning such as, for example, a mathematical expression. However, it should be understood that such a character string is merely one example of a character expressions and that character expressions may comprise different arrangements of characters without departing from claimed subject matter.

In yet another particular example, a "binary string" may comprise a linear array of symbols as bits representing "1" or "0". It should be understood, however, that these are merely examples of strings, and the types of symbols that may be represented in a string, and claimed subject matter is not limited in these respects.

According to an embodiment, although claimed subject matter is not limited in these respects, a string of alphanumeric characters may be used to express a quantity according to particular formats for representing quantities such as, for example integer, and floating and/or fixed decimal point formats. Here, for example, an alphanumeric string may comprise a concatenation of alphanumeric characters selected from among "0," "1," "2," "3," "4," "5," "6," "7," "8," and/or "9" to express a quantity as a base ten or base eight expression in such an integer or floating and/or fixed decimal point format, for example. In a floating decimal point format, for example, one or more alphanumeric characters may be used to indicate a location for a decimal point among digits in the floating point expression. In another embodiment, a string of alphanumeric characters may be used to express one or more words in a spoken language (e.g., English, Spanish, French, Russian, Greek, Japanese, etc.). However, these are merely examples of how a character string may form a character expression and claimed subject matter is not limited in these respects.

According, to an embodiment, and as illustrated below, a binary string may represent a character and/or string of characters according to an association of characters and binary strings. In another embodiment, a binary string may comprise a concatenation of symbols selected from "1" and/or "0" to express a quantity as a binary expression (e.g., as a 2's-complement expression or unsigned expression as illustrated below, for example). However, these are merely examples of how binary strings may be used to express numerical values and/or quantities, and claimed subject matter is not limited in these respects.

According to an embodiment, an expression of a query may comprise one or more "query character expressions" to represent portions of a query. In a particular example, although claimed subject matter is not limited in this respect, a query character expression may comprise a string of characters representing an operand and/or portion of an argument that forms a query. However, this is merely an example of a query character expression and claimed subject matter is not limited in this respect.

In other embodiments, a character expression may represent all or a portion of information from a data source that may be used in a "data character expression" to process a query. Here, for example, a data character expression may comprise one or more character strings representing all or a portion of information from a data source that may be used in processing a query. Accordingly, processing a query of information from a data source may comprise processing data character expressions provided by the data source. In a particular embodiment in which a data source comprises information provided by one or more data streams, such information may be represented as one or more "data stream character expressions." Accordingly, processing a query of information provided by one or more data streams may comprise processing one or more data stream character expressions.

According to an embodiment, a data stream character expression may be expressed as a concatenation of binary expressions associated with individual characters in the data stream in one or more "data stream binary strings." A query to information in the data stream may be processed based, at least in part, on the one or more data stream binary strings. However, this is merely an example embodiment and claimed subject matter is not limited in this respect.

As illustrated above, a query may comprise one or more query character expressions as illustrated above. Such a query may be processed based, at least in part, on a query binary string comprising a concatenation of one or more binary expressions associated with one or more individual characters of at least one of said query character expressions. Referring to FIG. 1, for example, a query comprising one or more query character expressions is obtained at block 12. As illustrated below, individual characters in a query character expression may be associated with a binary expression according to an association of characters and binary expressions. Block 14 may concatenate such binary expressions associated with individual characters in the query character expression to provide one or more query binary strings. Block 16 may then process the query based, at least in part, on the one or more query binary strings.

In one particular embodiment, although claimed subject matter is not limited in this respect, block 16 may additionally obtain one or more binary strings comprising a concatenation of binary expressions of characters in a data character expression that represents information to which the query is directed. Block 16 may then process the query based, at least in part, on the one or more binary strings and one or more query binary strings provided at block 14. Here, for example, block 16 may process the query by, for example, determining a relationship between information represented by the data character expression and information represented by the query character expression based, at least in part, on the one or more query binary strings and one or more data binary string.

In one particular embodiment, for the purpose of illustration, a data character expression may indicate information relating to a financial transaction such as a price in dollars. Here, a query may comprise a query character expression representing a dollar value that the query is to compare to the price for determining whether the price exceeds the dollar value. As illustrated below, binary expressions of individual characters in the data character expression representative of the price may be concatenated to form a data binary string while binary expressions of individual characters in the query character expression may be concatenated to form a query binary string. The query may then be processed based, at least in part, on the query and data binary strings to determine whether the price exceeds the dollar amount. However, this is merely a particular example of how a query may be processed based, at least in part, on first and second binary strings and claimed subject matter is not limited in this respect.

In a particular embodiment, although claimed subject matter is not limited in this respect, one or more query character expressions and a data character expression may represent respective first and second quantities. Block 16 may determine a "quantitative relationship" between the first and second quantities based, at least in part, on the one or more query binary strings and one or more data binary strings. The one or more query binary strings and one or more data binary strings may comprise concatenations of binary expressions associated with individual characters in the data and query character expressions. Here, for example, such a quantitative relationship may comprise an equality and/or inequality relationship between and/or among the first and second quantities. However, these are merely examples of quantitative relationships that may be determined between and/or among quantities and claimed subject matter is not limited in this respect. In a particular embodiment, although claimed subject matter is not limited in this respect, first and second quantities may be expressed as respective first and second strings of alphanumeric characters. Again, however, this is merely an example of a particular embodiment and claimed subject matter is not limited in these respects.

In one particular embodiment, a query may comprise a query character expression representing a dollar value that the query is to compare to a transaction price for determining whether the transaction price exceeds the dollar value. As illustrated below, binary expressions of individual characters in the data character expression representative of the transaction price may be concatenated to form a data binary string while binary expressions of individual characters in the query character expression may be concatenated to form a query binary string. The query may then be processed based, at least in part, on the query and data binary strings to determine whether the price exceeds the dollar amount. However, this is merely a particular example of how a query may be processed based, at least in part, on first and second binary strings and claimed subject matter is not limited in this respect.

Figure 2:
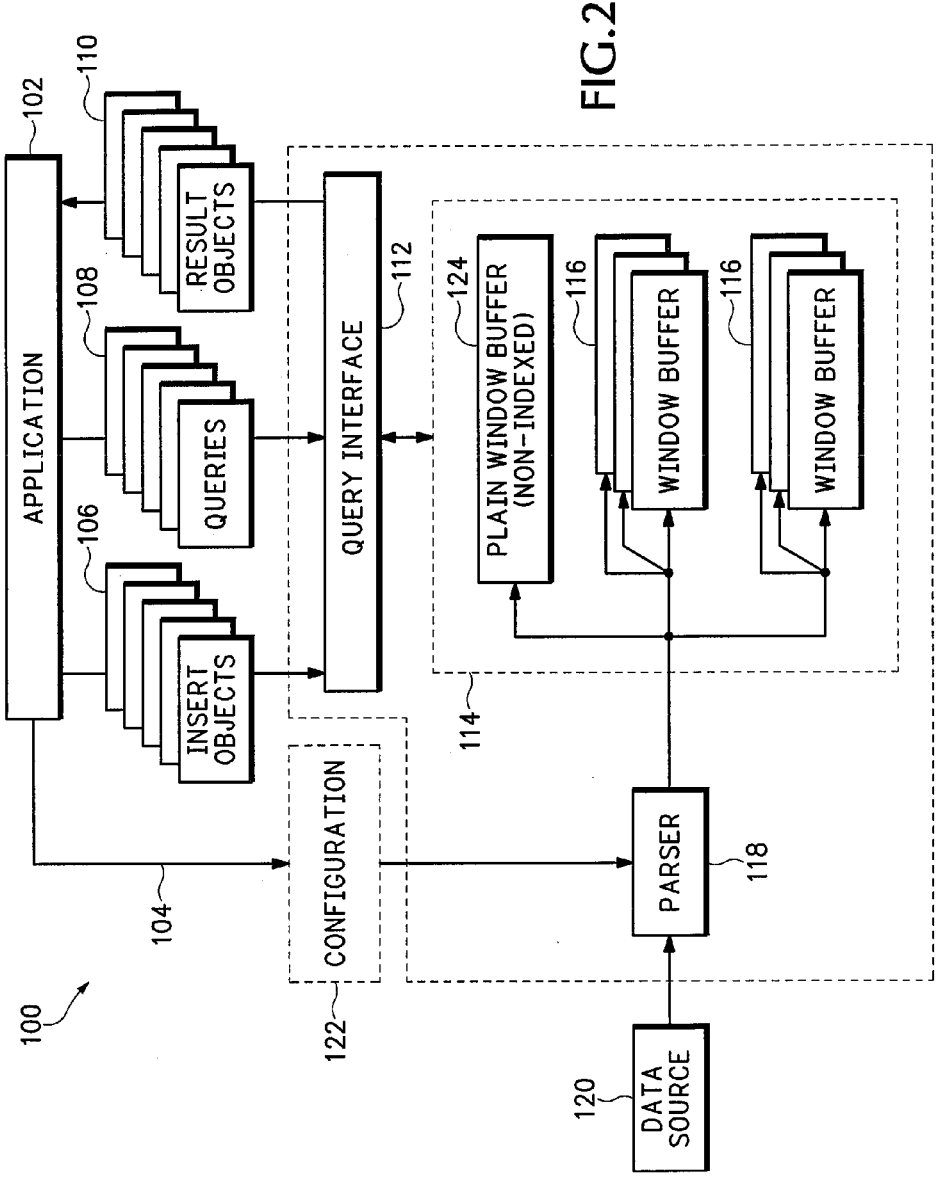
FIG. 2 is a schematic diagram illustrating a system to process queries according to an embodiment.

FIG. 2 is a schematic diagram of a system 100 to process queries of information received from a data source 120 according to an embodiment. In one embodiment, data source may 120 may comprise a data stream to provide information over time. For example, such a data stream may comprise information reporting events and/or transactions such as, for example, stock trades and/or movements in stock prices, for example. However, this is merely an example of how a system may be employed to process queries of information from a data source and claimed subject matter is not limited in this respect.

According to an embodiment, a data stream at data source 120 may comprise multiple data streams as a composite data source providing information that may be the subject of a query. Continuing with the example above for data streams providing information reporting events and/or transactions in connection with stock trades and/or movements in stock prices, such multiple composite data streams may comprise such information from multiple stock exchanges (e.g., NASDAQ, NYSE and/or the like). However, this is merely an example of multiple data streams in a composite data stream according to a particular embodiment and claimed subject matter is not limited in these respects.

According to an embodiment, a data stream may be received from data source 120 using any one of several technologies for transmitting information in a network such as, for example, stream-based protocols providing data at set intervals (e.g., as in Synchronous Optical NETwork (SONET) and or Asynchronous Transfer Mode (ATM) protocols). However, these are merely examples of stream-based protocols that may be used for transmitting information in a data stream and claimed subject matter is not limited in these respects. In alternative embodiments, a data stream may be received from a data source as bursts according to any one of several packet-based communication protocols such as, for example, TCP/IP over any one of several data link protocols such as, for example, data protocols substantially compliant with versions of IEEE Std. 802.3, IEEE Std. 802.11 and/or IEEE Std. 802.16, to name a few. However, this is merely an example of a communication protocol that may be used for transmitting information in a data stream and claimed subject matter is not limited in this respect.

By receiving information indicative of events and/or transactions in a data stream, queries may be processed based on information most recently provided to a data source. Here, such information describing an event and/or transaction may be provided in a data stream contemporaneously with occurrences of such an event and/or transaction. In alternative embodiments, data source 120 may comprise data stored on one or more mass storage devices. Such a mass storage device may comprise, for example, information indicative of events and/or transactions occurring over a period (e.g., week, day, year, etc.).

According to an embodiment, a parser 118 may process information received from data source 120 to obtain information in a format that may be readily queried using one or more techniques illustrated below. For example, in a particular embodiment, parser 118 may represent information in a data character expression as a concatenation of binary expressions associated with individual characters in the data character expression. Also, parser 118 may associate information of interest from data source 120 with indices to be employed in processing queries as illustrated below.

In one embodiment, information received from data source 120 may be organized according to a predetermined format. For example, information provided from data source 120 comprising a database may organize data character expressions in records and/or fields according to a database structure (e.g., in a hierarchical or relational database structure). In another embodiment, specific character expressions in a data stream comprising information of interest may be located in particular predefined character and/or data fields in the data stream. In a particular embodiment in which a data stream provides data in data packets, for example, header information in a data packet may indicate presence of a character expression of interest in a payload portion of the data packet at a particular predefined location in the data packet. In another embodiment, such locations of specific character expressions of interest may be indicated by other metadata that exists externally from the data stream. It should be understood, however, that these are merely examples of how a data source may organize data character expressions according to a predetermined format and claimed subject matter is not limited in these respects.

According to an embodiment, a configuration module 122 may determine how parser 118 is to interpret data received from data source 120. For example, configuration module may configure and/or program parser 118 to obtain information of interest from data source 120.

Figure 3:
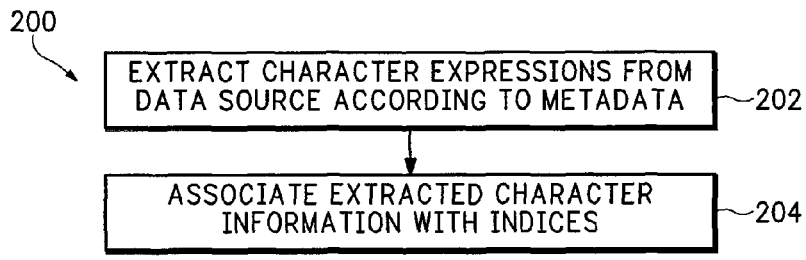
FIG. 3 is a flow diagram illustrating a process to associate indices with information according to an embodiment.

FIG. 3 is a flow diagram illustrating a process 200 performed by parser 118 to process information received from data source 120 according to an embodiment. At block 202, parser 118 may extract one or more data character expressions from data source 120 according to metadata. Such metadata may be provided by, for example, application 102 in the form of metadata 104 to configuration module 122. Configuration module 122 may then configure and/or program parser 118 to obtain information from data source 120 according to metadata 104. In other embodiments, parser 118 may obtain information of interest from data source 120 according to metadata provided in data source 120. According to a particular embodiment, therefore, parser 118 may extract character expressions from data source 120 according to metadata 104. In a particular example, although claimed subject matter is not limited in this respect, metadata 104 may specify locations of data character expressions from data source 120 according to an industry standard format such as, for example, one or more formats promulgated by the Securities Industry Automation Corporation (SIAC) and/or the Chicago Mercantile Exchange (CME), to name just two. Alternatively, data source 120 may provide data character expressions in documents formatted according to a markup language (e.g., standard generalized markup language (SGML), hypertext markup language (HTML) or eXtensible markup language (XML)) while metadata 104 comprises document type definitions specifying, for example, tags identifying locations of data character expressions of interest. It should be understood, however, that these are merely examples of techniques to organize data character expressions according to a format that may be indicated by metadata, and claimed subject matter is not limited in these respects.

Character expressions extracted at block 202 may comprise any one of several types of character expressions comprising information such as, for example, transaction identification information including stock ticker symbols, information descriptive of a transaction volume and/or price. However, these are merely examples of information that may be represented and/or expressed by a data character expression from a data source and claimed subject matter is not limited in these respects. In addition to extracting data character expressions from data source 120 at block 202, parser 118 may also concatenate binary expressions associated with one or more individual characters in an extracted character expression to form one or more data binary strings as illustrated in U.S. Non-provisional patent application Ser. No. 11/509,420 titled "Method and/or System for Comparing Character Expressions," filed on Aug. 23, 2006, and as described below with reference to FIG. 6.

In a particular example, for the purpose of illustration, a data character expression comprising a ticker symbol "IBM" may be represented by the data binary string "01 001 001 01 000 010 01 001 101" comprising a concatenation of the binary expressions "01 001 001", "01 000 010" and "01 001 101" associated with the characters "I", "B" and "M", respectively, according to the association of characters and binary expressions illustrated below in Table 3. Price information in a data character expression may be represented by the character expression "098" to represent a share price of ninety-eight dollars, as an example. Here, parser 118 may represent such a share price as a concatenation of binary expressions "00 110 000", "00 111 001" and "00 111 000" associated with the characters "0", "9" and "8", respectively, according to the association of characters and binary expressions illustrated below in Table 2. Again, these are merely examples of how information in a data character expression may be represented as a concatenation of binary expressions associated with one or more characters in the data character expression, and claimed subject matter is not limited in these respects.

According to an embodiment, information from data source 120 may be organized according to particular attributes. In the case of information relating to a transaction for the sale of stock, as a particular example, such information may indicate relate to a price at which shares of stock are being sold in such a transaction. Here, for example, such an indication of a price may be organized according to one or more attributes such as, for example, a ticker symbol representing the issuer of the stock, time/date when transaction was completed, and/or the like. However, these are merely examples of attributes that may be associated with information from a data source and claimed subject matter is not limited in this respect. In one particular embodiment, although claimed subject matter is not limited in these respects, system 100 may define indices to correspond with attributes which are associated with information from data source 120.

Accordingly, as illustrated below according to a particular embodiment, portions of information from data source 120 may be associated with indices to identify attributes associated with such portions of information. In one embodiment, data character expressions extracted at block 202 may be associated with indices based, at least in part, on attributes associated with information expressed and/or represented by data character expressions extracted at block 204. Alternatively, data binary strings comprising concatenations of binary expressions associated with characters in a data character expression may be associated with indices based, at least in part, on attributes associated with information expressed and/or represented by the data character expression.

As illustrated above in a particular example, the binary string "01 001 001 01 000 010 01 001 101" comprises a concatenation of binary expressions associated with characters in ticker symbol "IBM" according to an association between characters and binary expressions. Here, the ticker symbol "IBM" may identify an attribute such as an issuer of a security and/or stock that is the subject of a transaction, for example. In a particular embodiment, block 204 may determine an index associated with such a ticker symbol (and the attribute it represents) by comparing the binary string "01 001 001 01 000 010 01 001 101" with other strings stored in memory.

In a particular embodiment, although claimed subject matter is not limited in this respect, a character expression representing an attribute may be a part of and/or associated with one or more character expressions comprising other related information. In a particular embodiment, such a character expression representing an attribute, such as a ticker symbol, may relate to and/or be a part of one or more character expressions comprising information relating to a transaction and/or event, for example. Continuing with the example above in connection with ticker symbol "IBM", one or more character expressions in data source 120 may comprise other information relating to a transaction and/or event involving issuer IBM such as, for example, a price, an number of shares sold and time of the transaction, to name a few. In this particular example, block 204 may also associate other information regarding such a transaction with an index associated with ticker symbol "IBM".

Figure 4:
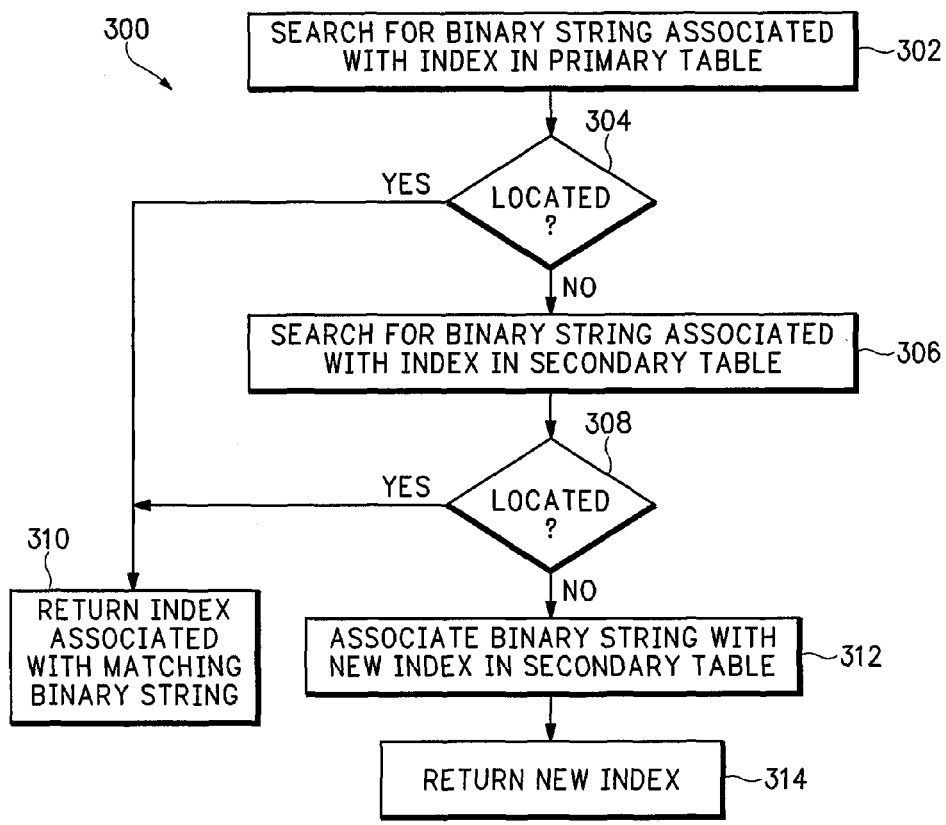
FIG. 4 is a flow diagram illustrating a process to associate indices with information according to an embodiment.

According to an embodiment, information expressed and/or represented by the data character expressions extracted at block 202 may be associated with indices using one or more tables. FIG. 4 is a flow diagram illustrating an embodiment of a process 300 to associate such information with indices. For example, a primary table may associate sequential indices with binary strings. In a particular embodiment, as illustrated with reference to Table 1, such a primary table may associate such sequential indices with addresses of memory locations of binary strings to be compared with binary strings representative of an attribute. However, this is merely an example of how indices may be associated with strings and claimed subject matter is not limited in this respect. Indices $I_1$ through $I_n$ may comprise indices in a primary table that may be associated with an attribute of information represented by a data character expression received from data source 120. Here, Table 1 associates indices $I_1$ through $I_n$ with string addresses $SA_1$ through $SA_n$.

TABLE 1

| Index | String Address |
|-------|----------------|
| $I_1$ | $SA_1$ |
| $I_2$ | $SA_2$ |
| ... | ... |
| $I_n$ | $SA_n$ |

According to an embodiment, block 302 may search among binary strings associated with indices to locate a binary string that matches a concatenation of binary expressions associated with one or more characters of a data character expression. As illustrated above, indices $I_1$ through $I_n$ may be associated with binary strings stored at string addresses $SA_1$ through $SA_D$, respectively. According to a particular embodiment, block 302 may search among binary strings stored in string addresses $SA_1$ through $SA_n$ to locate a matching binary string stored at string address $SA_m$. Upon locating such a matching binary string stored at string address $SA_m$, block 302 may determine that index $I_m$ is to be associated with an attribute associated with a data character expression (extracted at block 202 of process 200, for example).

Continuing with the example above in connection with a data character expression comprising ticker symbol "IBM", block 302 may search among binary strings stored at string addresses $SA_1$ through $SA_n$ to locate a binary string stored at string address $SA_j$ matching the binary string "01 001 001 01 000 010 01 001 101" (comprising a concatenation of binary expressions associated with characters in ticker symbol "IBM" as illustrated above). Upon finding such a match, block 302 may associate information relating to the data character expression with index $I_j$ to be returned at block 310. However, this is merely an example of how an index may be associated with information relating to a data character expression upon locating a matching binary string and claimed subject matter is not limited in this respect.

Binary strings located at addresses $SA_1$ through $SA_n$ may be formed from concatenations of binary expressions associated with characters in character expressions. According to an embodiment, indices $I_1$ through $I_n$ may represent at least a partial ordering of a sequence of such character expressions. For example, indices $I_1$ through $I_n$ may comprise numerals in an ascending sequence where $I_1$ is represented by a lowest value or numeral in the sequence and $I_n$ is represented by a highest value or numeral in the sequence. However, this is merely an example of how indices may comprise a sequential ordering and claimed subject matter is not limited in this respect. According to an embodiment, a sequential ordering of indices $I_1$ through $I_n$ may represent an ordering of a sequence of character expressions and/or binary strings associated with indices through $I_n$. Continuing with the particular example of stock ticker symbols, ticker symbols associated with stocks issued by IBM, Intel and Apple Computer, "IBM", "INTC" and "AAPL", respectively, may be ordered according to an alphabetic ordering "AAPL", "IBM" and "INTC". In this particular embodiment, an ordering of indices $I_1$ through $I_n$ may correspond with such an alphabetic ordering of ticker symbols. With such an alphabetic ordering, the ticker symbol "AAPL" may be associated with a numerical index $I_i$ in Table 1 that is lower (or less than) indices associated with ticker symbols "IBM" and "INTC". Likewise, the ticker symbol "IBM" may be associated with a numerical index $I_j$ in Table 1 that is lower (or less than) a numerical index $I_k$ associated with ticker symbol "INTC".

In particular embodiments as illustrated below with reference to Tables 2 and 3, numerical values represented by binary expressions (e.g., as an unsigned or 2's—complement expression) may indicate an ordering of a sequence of characters associated with the binary expressions. In a particular embodiment, numerical values represented by binary strings stored at string addresses $SA_1$ through $SA_n$ may also indicate an ordering of a sequence of character expressions associated with indices $I_1$ through $I_n$. Continuing the particular example above of an alphabetic ordering of ticker symbols "AAPL", "IBM" and "INTC" (associated with numerical indices $I_i$, $I_j$ and $I_k$, respectively), numerical values represented by binary strings stored at addresses $SA_1$ through $SA_n$ may ascend or descend with respect to 1 through n, for example. In a particular example where numerical values represented by binary strings stored at string addresses $SA_1$ through $SA_n$ ascend with respect to 1 through n, the binary string located at address $SA_i$ (associated with ticker symbol "AAPL") may represent a numerical value that is less and/or lower than a numerical value represented by the binary string located at address $SA_j$ (associated with ticker symbol "IBM"). Similarly, the binary string located at address $SA_j$ may represent a numerical value that is less and/or lower than a numerical value represented by the binary string located at address $SA_k$ (associated with ticker symbol "INTC").

According to an embodiment, block 302 may employ a binary search to locate a matching binary string among binary strings stored at string addresses $SA_1$ through $SA_n$. As illustrated above according to a particular embodiment, binary strings stored at string addresses $SA_1$ through $SA_n$ may represent numerical values. Additionally, block 302 may determine whether a particular binary string stored at string address $SA_p$ matches a binary string θ comprising a concatenation of binary expressions associated with characters of a data character expression which similarly represents a numerical value. Here, if block 302 determines that binary string θ does not match the binary string stored at string address $SA_p$, block 302 may determine whether a numerical value represented by θ is greater than or less than a numerical value represented by the binary string stored at string address $SA_p$.

As illustrated above according to a particular embodiment, numerical values represented by binary strings stored at string addresses $SA_1$ through $SA_n$ may indicate an ascending sequential ordering of indices through $I_n$ with respect to 1 through n. Here, if block 302 determines that a numerical value represented by binary string θ is less than a numerical value represented by a binary string stored at string address $SA_p$, block 302 may then commence a binary search for a matching binary string among binary strings stored at string addresses $SA_q$ where q<p. Similarly, if block 302 determines that a numerical value represented by binary string θ is greater than a numerical value represented by a binary string stored at string address $SA_p$, block 302 may then commence a binary search for a matching binary string among binary strings stored at string addresses $SA_q$ where q>p.

If block 302 does not locate a matching binary string among binary strings stored at binary string addresses as determined at diamond 304, block 306 may search for a matching binary string associated with an index of a secondary table associating indices with binary strings stored in memory. Upon locating a matching binary string, block 310 may return an index associated with the matching binary string in the secondary table. According to an embodiment, such a secondary table may be organized according to any one of several data structures for associating indices to binary strings stored in memory. In particular embodiments, although claimed subject matter is not limited in this respect, a secondary table may comprise a data structure that may be readily updated to incorporate additional indices and binary strings stored in memory associated with such additional indices. For example, a secondary table may associate indices and stored binary strings according to a map data structure representing nodes of a tree. Here, additional indices and/or binary strings may be incorporated by appending nodes. However, this is merely an example of how a secondary table associating indices and binary strings may be structured, and claimed subject matter is not limited in these respects.

If block 306 does not locate a binary string associated with a index in a secondary table that matches a data binary string, block 312 may store the data binary string in memory and associate the stored data binary string with a new index in the secondary table by, for example, appending a node to a map data structure representing nodes of a tree. Block 314 may then return the new index to be associated with an attribute of a data character expression extracted at block 202 of process 200.

According to an embodiment, updating a primary table employed at block 302 may comprise a processing resource and/or time intensive process. Nevertheless, from time to time a primary table employed at block 302 may be updated to incorporate indices associated with binary strings in a secondary table employed at block 306 to enable faster location of matching strings and associated indices identified in the secondary table. For example, indices associated with binary stings in a secondary table may be incorporated in a primary table comprising a format substantially according to Table 1. In this particular embodiment, indices $I_1$ through $I_n$ may be associated with different binary string addresses in the updated primary table such that indices $I_1$ through $I_n$ indicate a sequential ordering of associated data character expressions and indicate a sequential ordering of numerical values represented by binary strings stored at binary string addresses $SA_1$ through $SA_n$. Accordingly, block 302 may continue to locate binary strings associated with indices $I_1$ through $I_n$ in the updated primary table as illustrated above according to particular embodiments. Upon such events to update the primary table, the indices incorporated into the primary table may be removed from the secondary table. In one particular embodiment, a secondary table may be initialized as an empty table to which new indices are incorporated over time as data binary strings do not match stored binary strings associated with indices in either a primary table at block 302 or a secondary table at block 306 as illustrated above.

Returning to FIG. 2, upon associating information comprising a data character expression and/or binary string with an index at parser 118, such information may be stored in a window buffer 116. In one particular embodiment, parser 118 may select a particular window buffer 116 to store such information based, at least in part, on some attribute associated with the information. As illustrated above according to particular embodiments, parser 118 may associate indices with information comprising character expressions received from data source 120 and/or binary strings comprising concatenations of binary expressions associated with characters in such character expressions. In some embodiments, however, parser 118 may store at least some of such information that is not associated with any such index in a window buffer 124. Here, such information in window buffer 124 may be sequentially accessed in response to a query without the need for specifying an index to information stored in window buffer 124.

According to a particular embodiment, although claimed subject matter is not limited in this respect, parser 118 may select a particular window buffer 116 and/or 124 to store information comprising a data character expression and/or binary string based, at least in part, a particular data source and/or data stream associated with such information. Here, for example, parser 118 may determine a particular data source and/or data stream (e.g., from among a plurality of data sources and/or data streams) associated with such information based, at least in part, on a tag and/or identifier associated with such information (e.g., obtained from data source 120) and/or metadata 104. Accordingly, information associated with such a particular source may be accessed in response to a query by specifying a particular window buffer storing such information associated with the particular source and/or data stream.

In a particular embodiment in which a data character expression and/or such information is associated with a particular source and/or data stream comprising stock exchange (e.g., NYSE, NASDAQ, etc.), parser 118 may store such information in a window buffer 116 and/or 124 dedicated to storing data from the particular stock exchange. Such information may include, for example, information relating to transactions conducted on a particular exchange and/or the like. Continuing the particular example illustrated above in which information indices are associated with information based on an issue of a security and/or stock (e.g., as represented by a ticker symbol), information in a window buffer 116 storing information relating to NYSE transactions may further be organized by indices associated with particular issuers of stock on this exchange. For example, parser 118 may store information associated with ticker symbol "IBM" in a window buffer 116 dedicated to storing information associated with NYSE according to an index associated with such information (e.g., associated by parser 118 as illustrated above in connection with particular embodiments). Accordingly, information associated with issuer IBM may be accessed in response to queries specifying a window buffer 116 dedicated to storing information associated with NYSE transactions and an index associated ticker symbol "IBM". Similarly, information associated with transactions associated with issuer Intel Corp. may be stored in a window buffer 116 dedicated to storing information associated with NASDAQ transactions. Accordingly, information associated with issuer Intel Corp. may be accessed in response to queries specifying a window buffer 116 dedicated to storing information associated with NASDAQ transactions and an index associated ticker symbol "INTC".

As illustrated above, a window buffer may be dedicated to storing information comprising data character expressions and/or binary strings associated with a particular attribute such as, for example, a particular data source and/or data stream. According to an embodiment, parser 118 may aggregate information associated with multiple attributes for storage in a single window buffer 116 and/or 124. Here, parser 118 may store such aggregated information associated with multiple sources and/or data streams in a single window buffer 116 and/or 124 in addition to, or in lieu of, storing information associated with particular sources and/or data streams in buffer windows 116 and/or 124 dedicated to such particular sources and/or data streams as illustrated above.

Continuing with the example above in connection with information regarding transactions and/or events from stock exchanges, parser 118 may store information relating to transactions aggregated from multiple stock exchanges in a single window buffer 116 and/or 124. In a particular embodiment, parser 118 may also store such information in window buffers 116 and/or 124 that are dedicated to storing information associated with transactions on particular exchanges. For example, parser 118 may aggregate information regarding transactions on NASDAQ and NYSE for storage in an aggregated window buffer 116 and/or 124. Additionally, parser 118 may store information associated with transactions on NASDAQ in a window buffer 116 and/or 124 dedicated to storing information regarding transactions on NASDAQ and/or information associated with transactions on NYSE in a window buffer 116 and/or 124 dedicated to storing information regarding transactions on NYSE. Here, for example, information regarding a transaction involving issuer IBM may be accessed in response to a query specifying such an aggregated window buffer 116 and/or 124 or a window buffer dedicated to storing information regarding transactions on NYSE.

According to an embodiment, a window buffer 116 and/or 124 may comprise one or more devices capable of storing information in a retrievable format. In a particular embodiment where data source 120 comprises one or more data streams, a window buffer 116 and/or 124 may be updated from time to time with new information received from the data stream. In addition to storing new information received from a data stream, a window buffer 116 and/or 124 may maintain "historical data" stored in connection with previous updates to the window buffer 116 and/or 124. From time to time and/or according to a process, historical data stored in a window buffer 116 and/or 124 may be made to expire. According to a particular embodiment, queries may be processed based, at least in part, on unexpired information stored in a window buffer 116 and/or 124. Here, accordingly, a window buffer 116 and/or 124 may combine and/or merge unexpired information and new information received in an update for use in processing queries.

According to an embodiment, information in a window buffer 116 and/or 124 may be updated in response to new information extracted by parser 118 (e.g., data character expressions and/or binary strings comprising concatenations binary expressions of individual characters of a data character expression) and stored in the window buffer. In one particular embodiment, although claimed subject matter is not limited in this respect, a window buffer may discard and/or flush information that has been stored after a particular duration. In a particular example where information stored in a window buffer comprises information associated with transactions on a stock exchange, such information may be discarded and/or flushed after a duration such as, for example, ten seconds. It should be understood, however, that this is merely an example of a duration upon which information may be discarded and/or flushed from a window buffer and claimed subject matter is not limited these respects.

According to an embodiment, although claimed subject matter is not limited in these respects, information stored in a window buffer 116 and/or 124 may be maintained in the window buffer as identifiable data objects. For a particular data object, a window buffer 116 and/or 124 may continue to store information associated the particular data object up to a set number of transactions and/or updates, and discard and/or flush any information relating to older transactions and/or updates. In other embodiments, a window buffer 116 and/or 124 may store information associated with a most recent transaction and/or update associated with a particular data object and flush information associated with other transactions and/or updates associated with the particular data object.

In a particular application, a window buffer 116 and/or 124 may store information associated with transactions and/or trades on a stock exchange as data objects. Here, for example, such data objects may comprise information associated with a purchase and/or sale of stock of a particular company. In a particular example, such a data object may comprise information in a window buffer stored in association with an index associated with a ticker symbol as illustrated above (e.g., as determined by parser 118). For a particular one of such objects, for example, a window buffer 116 may store information associated with a most recent transaction and/or trade associated with a ticker symbol and/or issuer of a security, and discard and/or flush information associated with any other transactions and/or trades associated with the ticker symbol and/or issuer. Alternatively, a window buffer 116 may store information associated with a set number of the n most recent transactions and/or trades associated with a ticker symbol and/or issuer of a security, and discard and/or flush information associated with any other transactions and/or trades associated with the ticker symbol and/or issuer. It should be understood, however, that these are merely examples of how information in a window buffer may be updated and claimed subject matter is not limited in these respects.

According to an embodiment, information stored in window buffers 116 and/or 124 may be accessed in response to a query 108 received from an application 102. Queries 108 may be provided in any particular format used to express a query of information such as, for example, query language such as, for example, a structured query language (SQL) and/or variations thereof. However, this is merely an example of how a query from an application may be formatted according to a particular query syntax and/or language, and claimed subject matter is not limited in this respect. Query interface 112 may interact with engine 114 to process queries 108 and provide result objects 110 as responses to queries 108.

According to an embodiment, a query 108 may comprise information associated with a particular data item stored in a window buffer 116 and/or 124. As illustrated above, information stored in a window buffer 116 may be identifiable by an index (e.g., determined by parser 118). Additionally, a window buffer 116 and/or 124 may store information associated with a particular attribute such as, for example, a particular data source and/or data stream associated with stored information. Here, for example a query may comprise sufficient information to locate information stored in a window, a query operator and/or a query character expression. Accordingly, in one particular embodiment a query 108 may comprise a format as follows:

<StoredInformationIdentifier><QueryOperator><QueryCharacterExpression> where:

"StoredInformationIdentifier" comprises information to identify information stored in a window buffer 116 and/or 124;

"QueryCharacterExpression" comprises a query character expression; and

"QueryOperator" comprises an operator relating information stored in the window buffer 116 and/or 124 with the information associated with QueryCharacterExpression.

It should be understood, however, that this is merely an example of a format for a query expression for the purpose of illustration according to a particular embodiment and that claimed subject matter is not limited in these respects. StoredInformationIdentifier may comprise information to identify a specific window buffer 116 and/or 124, an index associated with information stored in the specific window buffer 116 and/or 124 and/or other metadata to be used in locating information. Here, according to a particular embodiment, such information stored in window buffer 116 and/or 124 at a location according to StoredInformationIdentifier may comprise a binary string having, for example, a character expression and/or a concatenation of binary expressions associated with one or more characters of a data character expression. Such a data character expression may comprise, for example, an alphanumeric character expression representing, for example, a numerical quantity or a word, acronym and/or multi-character symbol in a spoken and/or written language, for example. However, these are merely examples of information that may be represented by a data character expression and claimed subject matter is not limited in this respect.

According to an embodiment, QueryCharacterExpression may similarly comprise a character expression such as, for example, an alphanumeric character string representing, for example, a numerical quantity or a word in a spoken and/or written language. Again, however, these are merely examples of what a character expression may represent according to particular embodiments and claimed subject matter is not limited in these respects. According to an embodiment, although claimed subject matter is not limited in these respects, QueryOperator may comprise an operator relating information represented by QueryCharacterExpression and information stored in a window buffer 116 and/or 124 at a location according to StoredInformationIdentifier. In a particular embodiment, although claimed subject matter is not limited in this respect, QueryOperator may provide a Boolean result based, at least in part, on the information stored in a window buffer according to StoredInformationIdentifier and information represented by QueryCharacterExpression. Here, for example, QueryOperator may comprise any one of several relational operators such as, for example, ">" (greater than), "<" (less than), "=" (equal to), "≦" (less than or equal to), "≧" (greater than or equal to) and "≠" (not equal to), just to name a few. However, these are merely examples of a query operator that may be used to relate portions of a query expression and claimed subject matter is not limited in these respects.

As illustrated above, a query 108 may comprise one or more query character expressions such as, for example, stock ticker symbols or quantities such as dollars, just to name a few. In processing a query 108, query interface 112 and/or engine 114 may concatenate binary expressions associated with individual characters in such query character expressions to derive one or more binary strings as illustrated below with reference to FIG. 6. Query 108 may then be processed based, at least in part, on the one or more binary strings. As illustrated above, a query 108 may also include a query operator and/or reference to stored information comprising one or more binary strings (e.g., stored in a window buffer). Here, query interface 112 and/or engine 114 may process query 108 by determining a relationship according to the query operator between the one or more stored binary strings and the one or more binary strings derived from the query character expression.

In a particular embodiment where the query character expression of query 108 represents a first quantity, query interface 112 may determine a quantitative relationship between such a first quantity and a second quantity represented by stored information referenced by an identifier in the query 108. Based at least in part on a query operator specified in the query 108, in this particular example, the query 108 may be processed to determine whether the first quantity is greater than, less than, equal to, not equal to, etc., than the second quantity. Here, according to particular embodiments, query interface and/or engine 114 may employ one or more techniques illustrated below to determine a quantitative relationship between first and second character expressions.

In a particular application of processing a query 108 relating to trades and/or transactions on a stock exchange, the query 108 may comprise a stored information identifier indicating a location in a window buffer 116 and/or 124 storing information relating to a historical transaction price, for example. Such a stored information identifier may indicate, for example, a particular window buffer 116 and/or 124 storing information regarding trades on a particular exchange, an index associated with a particular issuer and/or ticker symbol and/or additional information further specifying historical price information. However, these are merely examples of how a stored information identifier may indicate a location of stored information and claimed subject matter is not limited in these respects. Here, the information stored at the location indicated at the location specified by the stored information identifier may comprise a first binary string comprising a concatenation of binary expressions associated with characters in a data character expression as illustrated above. Such a character expression may represent, for example, a quantity such as a historical transaction price in dollars. In this particular example, the query 108 may also specify a query character expression representing, for example, a quantity such as a threshold transaction price in dollars. To process this query 108, according to a particular embodiment, query interface 112 and/or engine 114 may concatenate binary expressions of characters in the query character expression to form a second binary string, and determine a quantitative relationship between the historical transaction price and the threshold transaction price based, at least in part, on the first and second binary strings using techniques illustrated below.

U.S. Provisional Patent Appl. No. 60/711,647, filed on Aug. 25, 2005, titled "Method and/or System for Comparing Character Expressions," and the discussion below describe techniques for determining relationships between and/or among character expressions based, at least in part, on binary strings comprising concatenations of binary expressions of the character expressions according to particular embodiments. Such techniques may be employed in processing queries as illustrated above according to particular embodiments. For example, such techniques may be used to determine a relationship between information represented by a data character expression and a query character expression according to a query operator.

According to an embodiment, although claimed subject matter is not limited in these respects, a character expression may be expressed as a "fixed length" string comprising a finite number of symbols arranged in a linear ordering. Here, for example, a fixed length string comprising a linear ordering of three symbols may represent a positive quantity of up to nine hundred ninety-nine as a base ten integer expression comprising alphanumeric characters "0," "1," "2," "3," "4," "5," "6," "7," "8," and/or "9". For representing positive quantities less than one hundred as a base ten integer expression, however, less than three symbols may be needed to express the positive quantity. For instance, the positive quantity of thirty-nine may be expressed as "039". Here, a first or left most symbol comprises a character "0" as "padding" since the base ten expression for the positive thirty-nine uses only two characters in the fixed length string. It should also be observed that the base ten expression "039" for the quantity thirty-nine is also "right justified" in that a least significant character "9" takes the right most position in the fixed length string.

It should be understood that right justification and left padding provide conventions to illustrate a location of information in a character and/or binary string. In the particular illustrated embodiment, such a right justified and zero padded expression provides a least significant character and/or bit in a right most position of a string, and padding of "0"s in positions of the string to the left of positions containing information. However, such a right justification and left padding may also apply to a transposition of such a string where a leftmost string position is swapped with a rightmost string position, and an order of string positions is maintained in reverse order from right to left. Under such a transposition, a least significant bit and/or character may exist in a left most position of a string and padding of "0"s may exist in string locations to the right of information in the string. Nevertheless, such a transposition may also said to be right justified and left padded.

In alternative embodiments, a fixed length string may represent values "1" and "0" at bit locations in a fixed length binary string. Here, for example, such a fixed length string may be defined by a word format in a computer platform (e.g., fixed length words of 16-bit, 32-bit, 64-bit, 128-bit and/or the like). As illustrated below, such a word format may define a format of a fixed length binary string to be stored, held and/or represented in a register of a computing platform. Here, such a register to store a fixed number of bits as a fixed length binary string may comprise a "fixed length register."

As pointed out above, a binary expression may represent a quantity. Such binary strings may be used to represent a quantity in any one of several formats. In one particular example, as pointed out above, a binary string may represent a quantity in an "unsigned" format as follows:

$$b_n \ldots b_1 b_0 = \sum_{i=0}^{n} b_i * 2^i \qquad (1)$$

where $b_i$ comprises a bit value of bit position i expressed as a "1" or a "0."

According to an embodiment, a first binary expression may be "added" to a second binary expression to provide a resulting, third binary expression. In a particular embodiment where the first and second binary expressions represent respective first and second quantities, for example, such third binary expression may represent a "sum" of the first and quantities. According to an embodiment, although claimed subject matter is not limited in this respect, an addition operation, represented here as the symbol "+," may add binary expressions to provide a sum as follows:

$$b_n \ldots b_1 b_0 = d_n \ldots d_1 d_0 + e_n \ldots e_1 e_0.$$

Such an addition operation may determine digits $b_i$ in a resulting sum by, beginning with a least significant digit, determining bit a value of corresponding digit as follows:

$b_i=0$ if $d_i=0$ and $e_i=0$;
$b_i=0$ if $d_i=1$ and $e_i=1$, (where a value of "1" is carried to be combined with $d_{i+1}$ and $e_{i+1}$ in determining $b_{i+1}$ for i+1 less than or equal to n); and
$b_i=1$ if $d_i=0$ and $e_i=1$ or $d_i=1$ and $e_i=0$.

It should be understood, however, that this is merely an example of how binary expressions may be added to provide a sum of two binary expressions and claimed subject matter is not limited in these respects.

According to an embodiment, a first binary expression may be "subtracted" from a second binary expression to provide a resulting, third binary expression. In a particular embodiment where the first and second binary expressions represent respective first and second quantities, for example, such third binary expression may represent a "difference" between the first and quantities. In one particular embodiment of a format of a binary expression, as pointed out above, a binary expression may represent a quantity as a "2's-complement" expression having a format outlined as follows:

a. fixed length binary string;
    b. a most significant bit (MSB) comprises a sign bit;
    c. information other than a sign bit is expressed in right justified bit positions; and
    d. bit positions between MSB and bit positions containing other information are padded with "0"s.

Here, an MSB (e.g., left most bit) in the fixed binary strings comprises a "sign bit." In one particular embodiment, an MSB of "0" indicates a non-negative quantity while an MSB of "1" indicates a negative quantity. If the MSB and/or sign bit of a 2's-complement binary expression comprises a "0", indicating a non-negative quantity according to the presently illustrated embodiment, the remaining bits in the expression may represent a quantity as illustrated above in the unsigned binary expression illustrated above in relation (1). In one particular example, such a 2's-complement binary expression may comprise a set 16-bit word size. Here, for example, a positive quantity "1607" expressed as a base ten integer may be expressed as a 16-bit word as "0 000 011 001 000 111." Since "1607" comprises a positive quantity, the most significant bit of its 2's-complement binary expression (e.g., in a leftmost position in the 16-bit word in this particular example) comprises "0."

If the MSB and/or sign bit of a 2's complement binary expression comprises a "1", indicating a negative quantity according to the presently illustrated embodiment, the remaining bits in the expression may represent a negative quantity based, at least in part, on an inversion of the remaining bits. Here, a negative quantity –N may be expressed using a 2's-complement form by, according to a particular embodiment, first obtaining a 2's-complement binary expression (or unsigned binary expression as illustrated above in relation (1), for example) of the positive quantity N. Second, a "1's-complement" of the binary expression of positive quantity N, ~N, may be obtained by replacing bit values of "1" with "0" and replacing bit values of "0" with "1". Third, a bit value of "1" is added to ~N to provide the 2's-complement expression of –N, while ignoring any carry from a most significant bit.

According to an embodiment, although claimed subject matter is not limited in these respects, the subtraction of a first quantity from a second quantity may be expressed as an addition of a negative of the first quantity to the second quantity, providing a third quantity as a difference between the first and second quantities. Here, the first and second quantities may be expressed as 2's-complement binary expressions. A 2's-complement expression of the negative of the first quantity may be obtained as illustrated above. Then, the 2's-complement expression of the second quantity may be added to the 2's-complement of the expression of the negative of the first quantity to provide a 2's-complement expression of a result of subtracting the first quantity from the second quantity. However, this is merely an example of how a result from a subtraction of a first quantity from a second quantity may be expressed and claimed subject matter is not limited in these respects.

According to an embodiment, although claimed subject matter is not limited in this respect, if a third quantity resulting from a subtraction of first quantity from a second quantity yields a negative quantity, the first quantity may be deemed to be "greater than" the second quantity. Also, if such a quantity resulting from a subtraction of a first quantity from a second quantity yields a positive quantity, the first quantity may be deemed to be "less than" the second quantity. In a particular example where first and second quantities are represented as 2's-complement binary expressions, if a most significant bit of a 2's-complement third quantity comprises "1" (indicating a negative quantity), the first quantity may be deemed greater than the first quantity. Similarly, if the most significant big of the 2's-complement third quantity comprises "0" (indicating a positive or zero quantity), the first quantity may be deemed to be "less than or equal to" the second quantity.

According to an embodiment, as pointed out above, a quantity may be expressed as a string of alphanumeric characters. In one particular example, such an alphanumeric string may comprise a concatenation of individual alphanumeric characters selected from "0," "1," "2," "3," "4," "5," "6," "7," "8," and/or "9." Using these alphanumeric characters, according to a particular embodiment, such a concatenation of individual characters may comprise a base ten expression of a quantity. Such a base ten expression of an integer or fixed and/or floating decimal point numeral may be formulated according to relation (2) as follows:

$$c_n \ldots c_1 c_0 = \sum_{i=0}^{n} c_i * 10^i \quad (2)$$

where $c_i$ comprises a value of a character at position i in a string of concatenated alphanumeric characters selected from "0," "1," "2," "3," "4," "5," "6," "7," "8," and/or "9."

Using these alphanumeric characters, according to an alternative embodiment, such a concatenation of individual characters "0," "1," "2," "3," "4," "5," "6," and/or "7" may comprise a base eight and/or octal expression of a quantity. Such a base eight and/or octal expression of an integer or fixed and/or floating decimal point numeral may be formulated according to relation (3) as follows:

$$c_n \ldots c_1 c_0 = \sum_{i=0}^{n} c_i * 8^i \quad (3)$$

where $c_i$ comprises a value of a character at position i in a string of concatenated alphanumeric characters selected from "0," "1," "2," "3," "4," "5," "6," and/or "7." It should be understood that such base eight and base ten expressions are merely examples of expressing quantities as strings of alphanumeric characters and that claimed subject matter is not limited in this respect.

According to an embodiment, although claimed subject matter is not limited in these respects, an alphanumeric character may be represented as a numeric code. Here, an alphanumeric character may be represented as a value according to an association of alphanumeric characters to values. In one particular example, characters may be associated with values according to the acronym for the American Standard Code for Information Interchange (ASCII). An ASCII code may be used for associating individual characters with integer values 0 to 127. Table 2 illustrates an association of the alphanumeric characters "0," "1," "2," "3," "4," "5," "6," "7," "8," and/or "9" with numeric values according to ASCII.

TABLE 2

| Alphanumeric Character | ASCII Code (In Octal) | 8-Bit Byte Representation of ASCII code |
|---|---|---|
| 0 | 060 | 00 110 000 |
| 1 | 061 | 00 110 001 |

TABLE 2-continued

| Alphanumeric Character | ASCII Code (In Octal) | 8-Bit Byte Representation of ASCII code |
|---|---|---|
| 2 | 062 | 00 110 010 |
| 3 | 063 | 00 110 011 |
| 4 | 064 | 00 110 100 |
| 5 | 065 | 00 110 101 |
| 6 | 066 | 00 110 110 |
| 7 | 067 | 00 110 111 |
| 8 | 070 | 00 111 000 |
| 9 | 071 | 00 111 001 |

According to a particular embodiment, an ASCII code may represent an alphanumeric character as an 8-bit byte comprising a string of binary bits. In alternative embodiments, ASCII may represent an alphanumeric character as a 7-bit byte. Such a 7-bit ASCII code may translate an 8-bit ASCII code by including a single "0" padding in the MSB of a 7-bit code. Here, an 8-bit byte binary expression associated with an alphanumeric character, such as an ASCII code, may also represent a value and/or quantity as illustrated above in relation (1). Such values and/or quantities may also be ordered according to alphanumeric characters that they represent. In one particular example, alphanumeric character "4" represents a numerical value and/or quantity that is greater than a numerical value and/or quantity represented by alphanumeric character "2." Likewise, the binary string associated with "4" according to ASCII, "0 110 100", represents a numerical value and/or quantity that is greater than the numerical value and/or quantity represented by the binary string associated with "2" according to ASCII, "0 110 010." Similarly, alphanumeric character "9" represents a numerical value and/or quantity that is greater than a numerical value and/or quantity represented by alphanumeric character "5." Likewise, the binary string associated with "9" according to ASCII, "0 111 001", represents a numerical value and/or quantity that is greater than the numerical value and/or quantity represented by the binary string associated with "5" according to ASCII, "0 110 101." Accordingly, the binary representations of alphanumeric characters "0," "1," "2," "3," "4," "5," "6," "7," "8," and/or "9" according to ASCII represents at least a partial ordering of an ordered sequence of these characters according to relation (4) as follows:

$$c_k > c_j \text{ if and only if } d_k > d_j \quad (4)$$

where:
- $c_k$ is a value and/or quantity represented by an alphanumeric character k selected from among "0," "1," "2," "3," "4," "5," "6," "7," "8," and/or "9";
- $c_j$ is a value and/or quantity represented by an alphanumeric character j selected from among "0," "1," "2," "3," "4," "5," "6," "7," "8," and/or "9";
- $d_k$ is a value and/or quantity of a binary string representing alphanumeric character k according to ASCII; and
- $d_j$ is a value and/or quantity of a binary string representing alphanumeric character j according to ASCII.

It should be understood, however, that this is merely an example of how binary representations of characters may form at least a partial ordering of an ordered sequence such characters, and claimed subject matter is not limited in these respects. For example, one or more portions of associated character codes and/or binary expressions set forth by the American National Standards Institute (ANSI) may similarly provide such a partial ordering of an ordered sequence of characters represented by the portions of character codes and/or binary expressions. It should also be understood that other character codes and/or binary expressions may be associated with international characters used to represent characters other than Arabic numerals and/or English letters (e.g., Greek, Russian, Japanese, Chinese, and/or the like).

While Table 2 illustrates an association between binary expressions and alphanumeric characters comprising numerals, such an association may also represent other alphanumeric characters with binary expressions. Here, for example, binary expressions may also be associated with characters that are used to form words for a spoken and/or written language. Table 3 below illustrates an association of such characters according to ASCII.

TABLE 3

| Alphanumeric Character | ASCII Code (In Octal) | 8-Bit Byte Representation of ASCII code |
|---|---|---|
| A | 101 | 01 000 001 |
| B | 102 | 01 000 010 |
| C | 103 | 01 000 011 |
| ... | ... | ... |
| X | 130 | 01 011 000 |
| Y | 131 | 01 011 001 |
| Z | 132 | 01 011 010 |
| a | 141 | 01 100 001 |
| b | 142 | 01 100 010 |
| c | 143 | 01 100 011 |
| ... | ... | ... |
| x | 170 | 01 111 000 |
| y | 171 | 01 111 001 |
| z | 172 | 01 111 010 |

The alphanumeric characters listed in Table 3 provide an example of alphanumeric characters that may be concatenated in a string to express a word, acronym and/or multi-character symbol according to a spoken and/or written language. As illustrated above according to particular embodiments, such alphanumeric characters may be used to form a multi-character symbol such as a stock ticker symbol. However, such words, acronyms and/or multi-character symbols are merely examples of character expressions that may be formed from a concatenation of such characters and claimed subject matter is not limited in these respects. As illustrated in Table 3, these alphanumeric characters may also be associated with binary expressions according to the aforementioned association between alphanumeric characters and binary expressions in ASCII. It should be observed that characters "A" through "Z" and "a" through "z" define particular orderings of ordered sequences of characters in an English language alphabet. Further, upper case characters "A" through "Z" are associated with binary expressions "01 000 001" through "01 011 010" (e.g., associated "101 through "132" in octal), respectively. Similarly, lower case characters "a" through "z" are associated with binary expressions "01 100 001" through "01 111 010" (e.g., associated with "141" through "172" in octal), respectively. Accordingly, binary expressions associated with upper case characters "A" through "Z" form a partial ordering of binary expressions associated with an ordered sequence of such characters. Here, in this particular embodiment, binary expressions representing characters have the following property where $\alpha$ and $\beta$ represent characters both selected from either "A" through "Z" or from "a" through "z" as follows:

$c_\alpha > c_\beta$ if and only if $\beta$ precedes $\alpha$ in an associated alphabet of characters "A" through "Z" or "a" through "z" where $c_\alpha$ is a numerical value and/or quantity associated with an unsigned binary expression associated with $\alpha$ and $c_\beta$ is a numerical value and/or quantity associated with an unsigned binary expression associated with $\beta$.

As illustrated above with reference to relations (2) and (3), alphanumeric characters may be concatenated in a string to provide a base ten or base eight representation of a quantity and/or numerical value. Such expressions may be further represented as a string of bits comprising a concatenation of binary representations of individual alphanumeric characters in the base ten expression. In one particular example, although claimed subject matter is not limited in this respect, a base ten expression of "1907" may comprise a concatenation of alphanumeric characters "1", "9", "0" and "7." This alphanumeric characters may be individually represented by binary strings "0 110 001", "0 111 001", "0 110 000" and "0 110 111", respectively, according to the association of alphanumeric characters and binary strings of Table 2. Accordingly, the value of the base ten expression "1907" may be represented as a concatenation of the individual binary strings representing alphanumeric characters "1", "9", "0" and "7" to provide a 32-bit binary string "00 110 001 00 111 001 00 110 000 00 110 111." Again, as illustrated above according to particular embodiments, a transaction price represented as a base ten expression may be represented as a concatenation of individual binary expressions associated with characters in the base ten representation of the transaction price.

Similarly, alphanumeric characters concatenated to form words of a spoken and/or written language. For example, according to a particular embodiment, characters "c", "a" and "t" may be concatenated to form the word "cat" and the characters "d", "o" and "g" may be concatenated to form the word "dog." Like base eight and/or base ten expressions of quantities, the word "cat" may be represented as a concatenation of the individual binary strings representing characters "c", "a" and "t" to provide a 24-bit binary string "01 100 011 01 100 010 01 110 100". Similarly, the word "dog" may be represented as a concatenation of individual binary strings representing characters "d", "o" and "g" to provide a 24-bit binary string "01 100 100 01 101 111 01 100 111." Again, as illustrated above according to particular embodiments, a multi-character symbol such as a stock ticker symbol may be represented as a concatenation of individual binary expressions associated with characters in the stock ticker symbol.

According to an embodiment, a relationship between first and second character expressions may be determined based, at least part, on a subtraction of a first binary string representing the first character expression from a second binary string representing a second character expression. In one particular example, first and second character expressions may express quantities and a result of such a subtraction may indicate a quantitative relationship between the first and second quantities. In one particular embodiment, although claimed subject matter is not limited in this respect, a first quantity expressed as an alphanumeric character string may be determined to greater than a second quantity expressed as an alphanumeric character string based, at least in part, on a result of subtracting a first binary string from a second binary string. As illustrated above, such a first binary string may comprise a concatenation of binary representations of individual alphanumeric characters in the first character string while the second binary string may comprise a concatenation of binary representations of individual alphanumeric characters in the second character string. In another particular example, first and second words, acronyms and/or multi-character symbols defined according to a spoken and/or written language may be expressed as strings of alphanumeric characters. A first binary string may comprise a concatenation of binary expressions representing characters in the first word, acronym and/or multi-character symbol while a second binary string may comprise a concatenation of binary expressions representing characters in the second word, acronym and/or multi-character symbol. Here, in a particular example, a result of subtracting the first binary string from the second binary string may determine an alphabetic ordering of the first and second words. However, these are merely examples of how a result from a subtraction of a first binary string from a second binary string may be indicative of a relationship between first and second character strings represented by the first and second binary strings, and claimed subject matter is not limited in these respects.

FIGS. 5 through 9 illustrate particular embodiments of determining a relationship between first and second character expressions based, at least in part, on binary strings comprising concatenations of binary expressions representing characters in the first and second character expressions. As illustrated above according to particular embodiments, such first and second character expressions may comprise a data character expression and a query character expression. In particular examples illustrated below, first and second alphanumeric character strings represent respective first and second quantities (e.g., in a base ten or base eight format) and binary expressions associated with individual characters in the alphanumeric character strings are concatenated to form first and second binary strings. A quantitative relationship between the first and second quantities is determined, at least in part on a subtraction of at least a portion of the first binary string from a portion of the second binary string. It should be understood, however, that this is merely an example embodiment directed to determining a quantitative relationship between quantities represented by character strings and that the techniques described may be generally applied to binary strings representing other types of character expressions.

Without belaboring the discussion, these techniques may be used to determine a relationship between first and second character strings comprising words, acronyms and/or multi-character symbols in a written and/or spoken language in other particular embodiments. As noted above, such words may be represented by binary strings representing a concatenation of binary expressions representing individual characters in the character strings. At least a portion of the first string may be subtracted from at least a portion of the second string to determine a relationship between the first and second words (e.g., an alphabetic ordering). Again, this is merely just an example embodiment and the techniques described herein may be applied to determining different relationships between and/or among different types of character expressions.

According to an embodiment, although claimed subject matter is not limited in this respect, a quantity may be expressed as an alphanumeric character string comprising a fixed number of alphanumeric characters. In one example, such an alphanumeric character string may be right justified, and left padded with the alphanumeric character "0". To express a quantity 1234 (e.g., one thousand, two hundred thirty four), for example, a twenty-four character string may read as follows:

"00000000000000000000001234".

A computer and/or machine may access "registers" defined in a storage medium capable of storing, holding and/or representing information. In one example, fixed length registers of a computer and/or machine may be defined to be a fixed size such as, for example, two, four or eight bytes where a byte comprises eight bits. In another example, portions of a register may be accessible by a computer instruction based, at least in part, on an address and/or identifier associated with the register. A register may comprise a hardware addressable memory location in a so-called hardware register. Alternatively, a register may comprise a software defined memory location in a system memory of a computer platform where such a register is not necessarily limited to a specific addressable hardware location. However, these are merely examples of a register and claimed subject matter is not limited in these respects.

Figure 5:
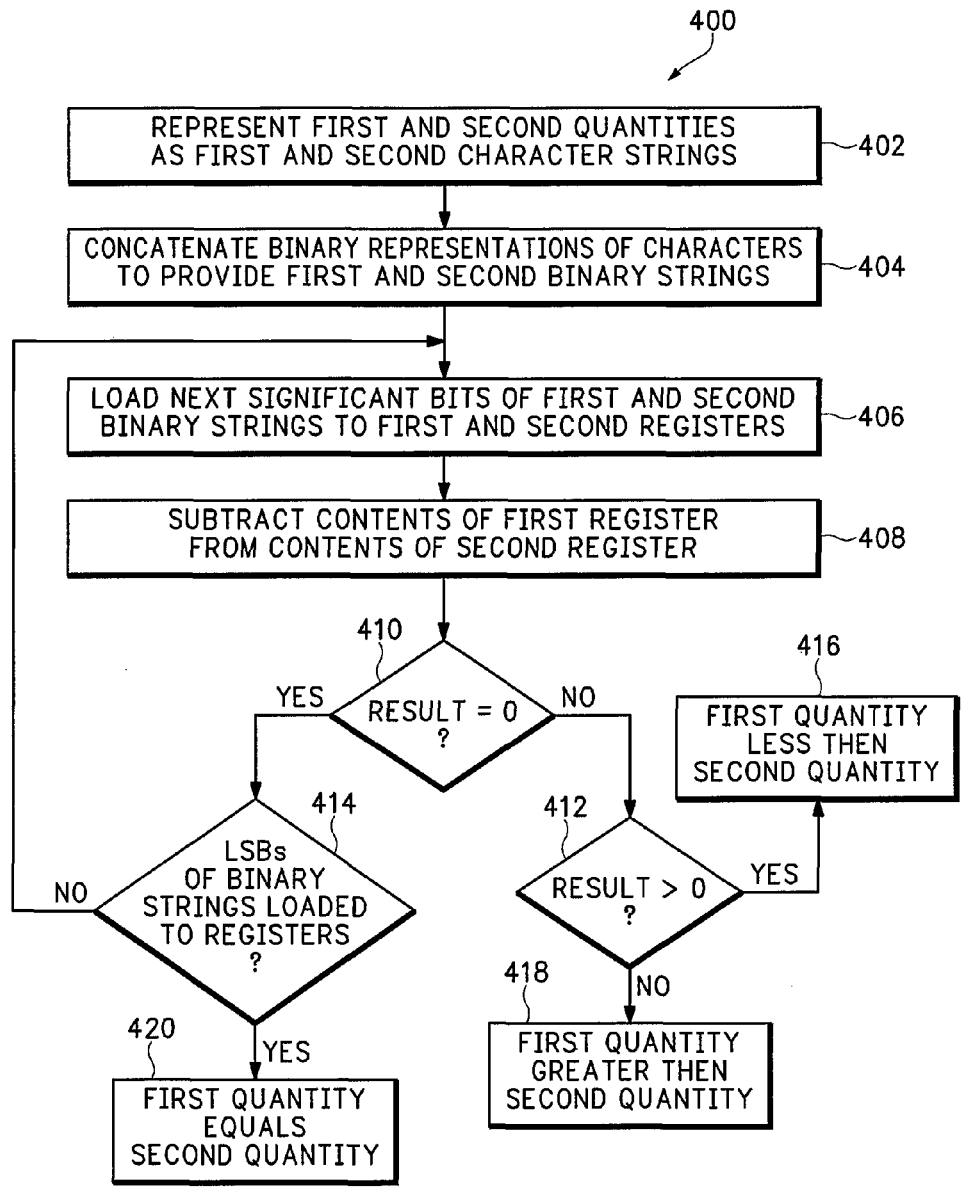
FIG. 5 is a flow diagram illustrating a process to determine a relationship among character expressions according to an embodiment.

FIG. 5 is a flow diagram illustrating a process embodiment 400 to determine a quantitative relationship between first and second quantities. In particular, process embodiment 400 may determine whether a first quantity is greater than, less than or equal to a second quantity. According to an embodiment, first and second quantities may be represented as strings of alphanumeric characters at block 402. In one particular embodiment, although claimed subject matter is not limited in these respects, such strings of alphanumeric characters may comprise alphanumeric characters "0," "1," "2," "3," "4," "5," "6," "7," "8," and/or "9". Further, such strings of alphanumeric characters may also represent the first and second quantities as quantitative expressions (e.g., base ten expressions or base eight expressions) in fixed length expressions which are right justified and left padded with the character "0" as illustrated above. Accordingly, such alphanumeric character strings may comprise the same number of characters. However, these are merely examples of how strings of alphanumeric characters may be used to express quantities and claimed subject matter is not limited in these respects.

According to an embodiment, characters in the alphanumeric character strings representing the first and second quantities may be associated with binary representations as illustrated above with reference to Table 2. In a particular example, such individual alphanumeric characters are associated with binary representations according to ASCII. Block 404 may concatenate binary representations of individual alphanumeric characters of alphanumeric strings representing the first and second quantities.

Figure 6:
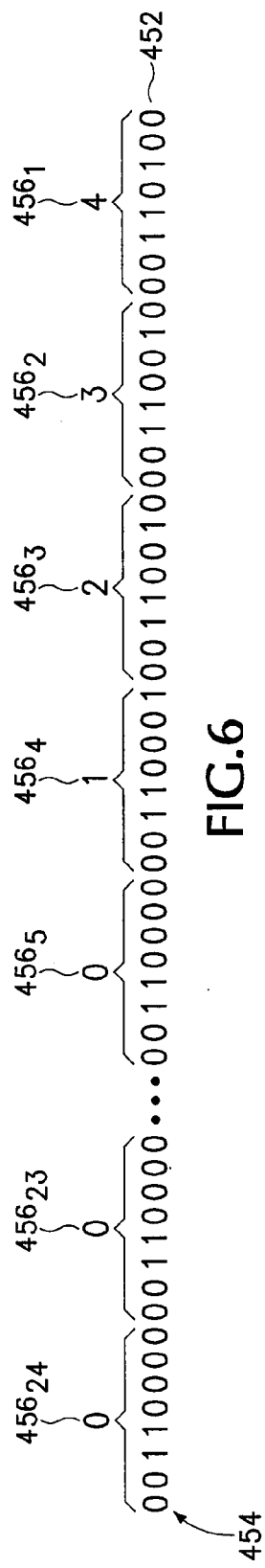
FIG. 6 is a schematic diagram illustrating a concatenation of binary representations of alphanumeric characters in a binary string according to an embodiment.
Figure 7:
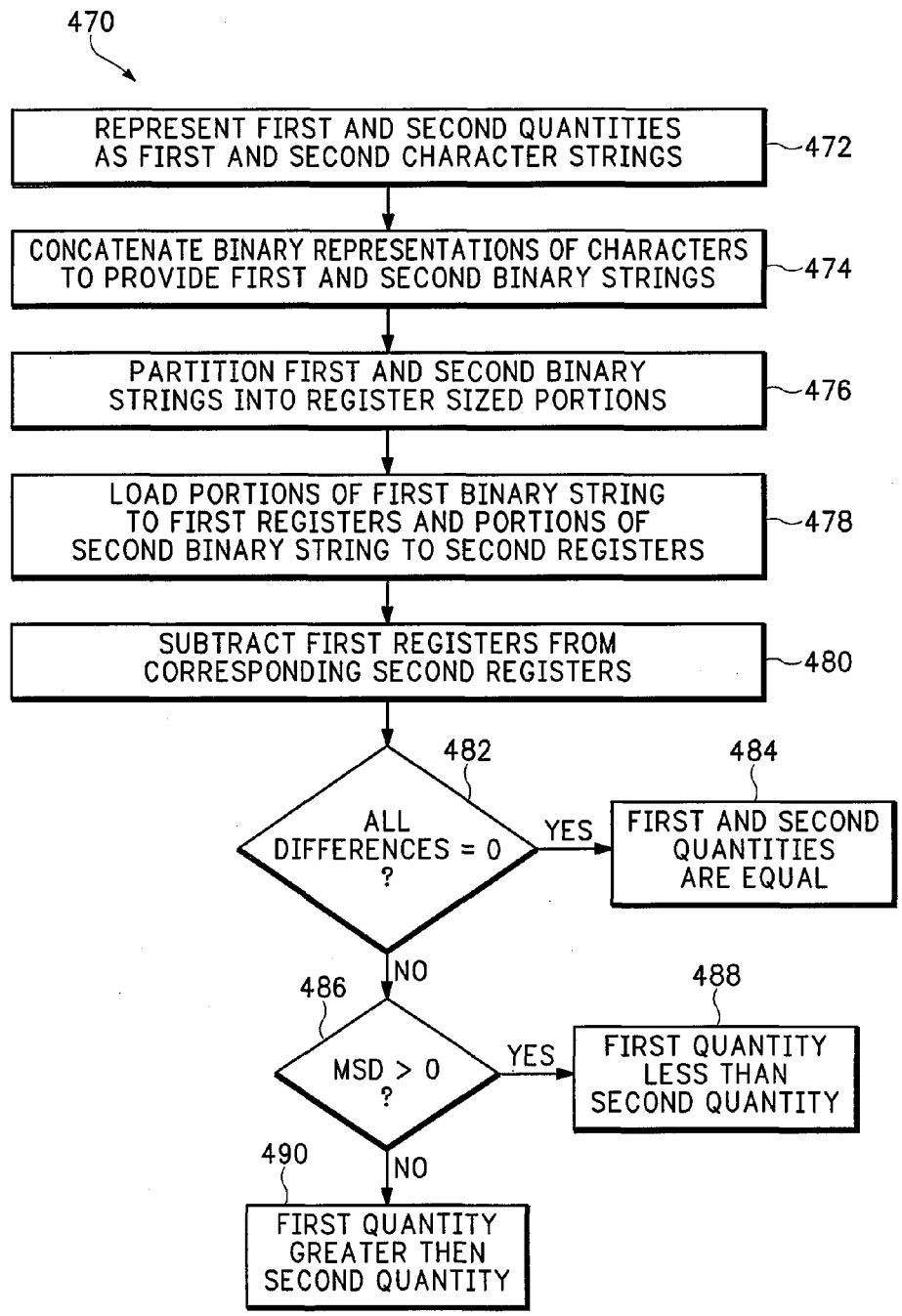
FIG. 7 is a flow diagram illustrating a process to determine a relationship among character strings according to an alternative embodiment.

FIG. 6 illustrates a concatenation of binary representations of alphanumeric characters 456 in an alphanumeric character string according to an embodiment block 404. Block 404 may concatenate binary representations of alphanumeric characters in alphanumeric character strings representing first and second quantities as illustrated in FIG. 2. Referring again to the example of expressing a quantity of one thousand, two hundred thirty four as a twenty-four character string ("000000000000000000001234"), an individual alphanumeric character 456 may be associated with a binary representation according to an association between alphanumeric characters and binary strings. In particular, for example, the alphanumeric character "0" is associated with the binary expression "00110000". Here, twenty such binary expressions "00110000" are concatenated together in binary string 452 to represent twenty alphanumeric characters $456_5$ through $456_{24}$ ("0") used as padding in the alphanumeric character string. Additionally, binary expressions "00110001", "00110010", "00110011" and "00110100" are concatenated together from left to right in binary string 452 to represent alphanumeric characters $456_1$ through $456_4$ ("1234"). As illustrated with reference to FIG. 6, accordingly, block 404 may create a first binary string from a concatenation of binary expressions representing a first alphanumeric character string (representing the first quantity) and a second binary string from a concatenation of binary expressions representing a second alphanumeric character string (representing the second quantity). Where the alphanumeric character strings representing the first and second quantities comprise the same number of characters and each character is represented by an 8-bit byte, according to a particular embodiment, resulting first and second binary strings comprise the same number of bits.

As illustrated below, portions of first and second binary strings determined at block 404 may be loaded to registers and manipulated to determine a quantitative relationship between first and second quantities. In one particular embodiment, although claimed subject matter is not limited in this respect, a register may be capable of holding, storing and/or representing a fixed number of bits in a linear array of bits. As will be illustrated throughout the remainder of this discussion for the purpose of illustrating a particular embodiment, a register will be capable of holding, storing and/or representing sixty-four bits. It should be understood, however, that this is merely an example of a size of a register that may be used to hold, store and/or represent a linear array of bits and that other sizes (e.g., 16-bit, 32-bit, 128-bit, etc.) may be used in other embodiments.

Referring again to a concatenation of binary representations of twenty four characters in an alphanumeric character string of FIG. 6, binary string 452 comprises 192 bits beginning with a most significant portion leading with byte "00110000" to represent alphanumeric character "0" and ending with a least significant portion trailing with byte "00110100" to represent alphanumeric character "4". Here, a 64-bit register is capable of holding, storing and/or representing a third of the 192 bits of binary string 452 at any one time. Blocks 406 and 408 may perform register operations on portions of the first and second binary strings determined at block 404 beginning with the most significant bits of the respective first and second binary strings.

In a first iteration of the loop set forth by block 406 through diamond 414, block 406 may load a portion of the first binary string comprising its most significant bits to a first register, $Reg_1$, and load a portion of the second binary string comprising its most significant bits to a second register, $Reg_2$. In subsequent iterations of the loop set forth by block 406 through diamond 414, according to a particular embodiment, block 406 may load next most significant bits of the first and second binary strings to $Reg_1$ and $Reg_2$, respectively. In a particular example wherein first and second binary strings each comprise 192 bits, and $Reg_1$ and $Reg_2$ comprise 64-bit registers, block 406 may load one third of the first and second binary strings to $Reg_1$ and $Reg_2$ per iteration.

According to an embodiment, although claimed subject matter is not limited in this respect, block 408 may subtract contents of $Reg_1$ from contents of and $Reg_2$. Here, the contents of $Reg_1$ and $Reg_2$ may be treated as quantities expressed in a 2's-complement form. Accordingly, the contents $Reg_1$ may be subtracted from the contents $Reg_2$ by adding a 2's-complement expression for the negative of the contents of $Reg_1$ to the contents of $Reg_2$. However, this is merely an example of how a portion of a first binary string may be subtracted from a portion of a second binary string, and claimed subject matter is not limited in this respect.

If a result of the subtraction at block 408 is a zero quantity as determined at diamond 410, the contents of $Reg_1$ and $Reg_2$ may be determined to be equal. Here, at least in terms of portions of the first and second binary strings evaluated in iterations of block 406 through diamond 410 in iterations of block 406 through diamond 414 thus far, the first and second quantities represented in alphanumeric character strings are equal. If all bits of the first and second binary strings have been loaded to registers and evaluated as determined at diamond 414, the first and second quantities may be determined to be equal at block 420. If the least significant bits (LSBs) of the first and second binary strings have not been loaded to registers and processed at blocks 406 and 408, process 400 may return to block 406 to load the next most significant bits of the first and second binary strings to $\text{Reg}_1$ and $\text{Reg}_2$. Here, the next most significant bits of the first and second binary strings may comprise the most significant bits of the portions of the first and second binary strings that are yet unprocessed at blocks 406 and 408.

Process 400 may be executed, at least in part, by computing platforms employing either a big endian processing architecture or a little endian processing architecture. In particular embodiments employing a big endian processing architecture, block 406 may merely copy register sized portions of a first and second binary strings stored in memory. In particular embodiments employing a little endian processing architecture, block 406 may retrieve register sized portions of the first and second binary strings and then transpose bytes in the retrieved portions before loading to registers. Here, with such a little endian processing architecture, a most significant byte portion of the retrieved portion of a binary string may be swapped with a least significant byte portion of the retrieved portion before loading to a register. Other bytes of the retrieved portion may be similarly transposed to provide in the register a reverse ordering of bytes in the retrieved portion. However, these are merely examples of how a computing platform using either a big endian or little endian processing architecture may retrieve portions of a binary string from memory and load the retrieved portions to registers, and claimed subject matter is not limited in these respects.

It should be noted that, in the particular illustrated embodiment, a binary expression associated with a character comprises an 8-bit byte with a zero value in a most significant bit position. Since a register in particular embodiments illustrated herein stores an integer number of bytes, such a resister storing a portion of a binary string formed from a concatenation of such binary expressions comprises a zero value in its most significant bit. Accordingly, such register sized portions of such a binary string may express a non-negative quantity in a 2's-complement form.

If a result of subtraction at block 408 does not equal zero as determined at diamond 410, the first and second quantities may be determined to be not equal. Accordingly, if such a result of subtraction at block 408 is greater than zero, the first quantity may be determined to be less than the second quantity. Otherwise, if such a result of subtraction at block 408 is not greater than zero as determined at diamond 412, the first quantity may be determined to be greater than the second quantity.

Process 400 illustrates sequential iterations of loading of portions first and second binary strings to registers, and then subtracting contents of registers where an execution of an iteration may be conditioned on a result of an execution of a previous iteration. In an alternative embodiment illustrated in FIG. 7, portions of a first binary string may be loaded to a plurality of corresponding registers while portions of a second binary string may be loaded to a plurality of different corresponding registers. Here, blocks 472 and 474 may provide first and second binary strings based, at least in part, on first and second alphanumeric strings as illustrated above with reference to blocks 402 and 404 of process 400. Block 476 may partition first and second binary strings into register sized portions. Block 478 may load register sized portions of the first string to first registers and register sized portions of the second string to second registers.

As shown in FIG. 8, for example, a first binary string 502 may be partitioned into register sized portions 506 while a second binary string 504 may be partitioned into register sized portions 508. Here, portion $506_0$ may comprise the most significant portion of first binary string 502 (e.g., the portion of first binary string 502 comprising the most significant bits of the binary string 502) while portion $506_2$ may comprise the least significant portion of first binary string 502 (e.g., the portion of first binary string 502 comprising the least significant bits of the binary string 502). Portions $506_0$, $506_1$ and $506_2$ are loaded to corresponding first registers $\text{Reg}_{0,1}$, $\text{Reg}_{1,1}$ and $\text{Reg}_{2,1}$, respectively.

Similarly, portion $508_0$ may comprise the most significant portion of second binary string 504 while portion $508_2$ may comprise the least significant portion of second binary string 504. Portions $508_0$, $508_1$ and $508_2$ are loaded to corresponding first registers $\text{Reg}_{0,2}$, $\text{Reg}_{1,2}$ and $\text{Reg}_{2,2}$, respectively. Accordingly, registers $\text{Reg}_{2,1}$ and $\text{Reg}_{2,2}$ store least significant portions of first binary string 502 and second binary string 504, respectively, while registers $\text{Reg}_{0,1}$ and $\text{Reg}_{0,2}$ store most significant portions of first binary string 502 and second binary string 504, respectively.

As illustrated above in connection with process 400, process 470 may similarly be executed, at least in part, by a computing platform employing either a big endian or little endian processing architecture. In a particular embodiment employing a big endian processing architecture, block 478 may load bytes of portions 506 and 508 to registers in the same order as retrieved from strings 502 and 504 from memory. In a particular embodiment employing a little endian processing architecture, block 478 may transpose bytes within portions 506 and 508 as retrieved from byte addresses in strings 502 and 504 in memory before loading to registers as illustrated above and maintaining the same order of bits within bytes transposed with portions 506 and 508. However, these are merely particular examples of how block 478 may be executed by a computing platform employing either a big endian or a little endian processing architecture and claimed subject matter is not limited in this respect.

Following loading of portions 506 and 508 to registers at block 478 as illustrated above, block 480 may then subtract portions 506 of first binary string 502 from corresponding portions 508 as follows:

$$\text{Reg}_0 \leftarrow \text{Reg}_{0,2} - \text{Reg}_{0,1}$$

$$\text{Reg}_1 \leftarrow \text{Reg}_{1,2} - \text{Reg}_{1,1}$$

$$\text{Reg}_2 \leftarrow \text{Reg}_{2,2} - \text{Reg}_{2,1}$$

Where:

$\text{Reg}_{i,1}$ is a register storing an ith register sized portion of the first binary string;

$\text{Reg}_{i,2}$ is a register storing an ith register sized portion of the second binary string; and $\text{Reg}_i$ is a register storing an ith difference between corresponding register sized portions of the first and second binary strings.

Here, the use of distinct registers $\text{Reg}_0$, $\text{Reg}_1$ and $\text{Reg}_2$ are merely used to illustrate storing a result from a subtraction operation. It should be understood, however, that any of registers $\text{Reg}_{0,2}$, $\text{Reg}_{0,1}$, $\text{Reg}_{1,2}$, $\text{Reg}_{1,1}$, $\text{Reg}_{2,2}$, and/or $\text{Reg}_{2,1}$ may be reused to store a such a result from a subtraction operation. Also, as pointed out above, any of the registers $\text{Reg}_0$, $\text{Reg}_1$, $\text{Reg}_2$, $\text{Reg}_{0,2}$, $\text{Reg}_{0,1}$, $\text{Reg}_{1,2}$, $\text{Reg}_{1,1}$, $\text{Reg}_{2,2}$, and/or $\text{Reg}_{2,1}$ may comprise a hardware addressable memory location in a so-called hardware register or, alternatively, a software defined memory location in a system memory of a computer platform where such a register is not necessarily limited to a specific addressable hardware location.

According to particular embodiment illustrated above, if the contents of registers $\text{Reg}_0$, $\text{Reg}_1$ and $\text{Reg}_2$ all comprise a 2's-complement expression for zero, as determined at diamond 482, the first and second quantities may be deemed equal. Otherwise, the first quantity may be deemed greater than or less than the second quantity based upon a sign of contents in a register $Reg_0$, $Reg_1$ or $Reg_2$ having non-zero contents and corresponding with the most significant portions of the first and second binary strings among registers having non-zero contents. Such a register may comprise a "most significant difference" (MSD) between portions of the first and second binary strings. For example, diamond 486 may determine whether the first quantity is greater or less than the second quantity based, at least in part, on a sign of such an MSD between portions of the first and second binary strings. In an example, as illustrated above, register $Reg_0$ may comprise a difference between most significant bits of respective first and second binary strings. Diamond 486 may determine that the first quantity is less than the second quantity if the contents of register $Reg_0$ comprises a 2's-complement expression of a positive quantity and determine that the first quantity is greater than the second quantity if the contents of register $Reg_0$ comprises a 2's-complement expression of a negative quantity. Otherwise, if contents of register $Reg_0$ comprises a 2's-complement expression of zero, diamond 486 may determine that the first quantity is less than the second quantity if $Reg_1$ comprises a 2's-complement expression of a negative quantity (where register $Reg_1$ therefore stores the MSD) and determine that the first quantity is greater than the second quantity if $Reg_1$ comprises a 2's-complement expression of a positive quantity.

FIG. 9 is a flow diagram illustrating a process embodiment 550 to determine a quantitative relationship between a first and second quantity such as, for example, determining whether a first quantity is greater than, less than or equal to a second quantity, according to an alternative embodiment. Here, block 552 may represent first and second quantities as strings of alphanumeric characters as illustrated above with reference to block 402 of process 400. Also, block 554 may concatenate binary representations of alphanumeric characters to provide first and second binary strings as illustrated above with reference to block 404 of process 400.

As illustrated above with reference to FIG. 5, where the alphanumeric character strings representing the first and second quantities comprise the same number of characters and each character is represented by an 8-bit byte, according to a particular embodiment, resulting first and second binary strings comprise the same number of bits. Block 556 may partition first and second binary strings into portions equaling a number of bits that may be held, stored and/or represented in a register. Again, as illustrated above, such registers may comprise fixed length registers capable of storing, holding and/or representing a fixed number of bits. Accordingly, such a register may store any predetermined number of bits (e.g., 8-bit registers, 16-bit registers, 32-bit registers, 64-bit registers, 128-bit registers and/or the like). In a particular embodiment in which a binary string may comprise 192 bits (as illustrated above with reference to FIG. 6) and registers are capable of storing, holding and/or representing 64 bits, for example, the binary string may be portioned into three 64-bit portions. It should be understood, however, that a 192 bit binary string and 64-bit register are discussed merely for the purpose of illustration and that claimed subject matter is not limited in this respect.

Block 558 may load differences between portions of the first and second binary strings to registers. Here, portions of the first binary string may be subtracted from associated portions of the second binary string with the results loaded to registers. Continuing with the previous example where first and second binary strings comprise 192 bits and a register can hold store and/or represent 64 bits, a first register may be loaded with a difference between most significant 64 bits of the first binary string and most significant 64 bits of the second binary string. Accordingly, a second register may be loaded with a difference between next most significant 64 bits of the first binary string and next most significant 64 bits of the second binary string. A third register may then be loaded with a difference between least significant 64 bits of the first binary string and least significant 64 bits of the second binary string.

According to an embodiment, loading of differences between portions of the first and second binary strings to registers may be referenced as follows:

$Reg_0 \leftarrow BS_2[0] - BS_1[0]$ $Reg_1 \leftarrow BS_2[1] - BS_1[1]$ $Reg_2 \leftarrow BS_2[2] - BS_1[2]$

. . .

$Reg_n \leftarrow BS_2[n] - BS_1[n]$

Where:
$BS_1[i]$ is the ith portion of the first binary string containing bits equaling the size of registers; and
$BS_2[i]$ is the ith portion of the second binary string containing bits equaling the size of registers.

According to a particular embodiment, although claimed subject matter is not limited in this respect, $BS_1[0]$ and $BS_2[0]$ may comprise portions comprising most significant bits of the first and second binary strings. Likewise, $BS_1[n]$ and $BS_2[n]$ may comprise portions comprising least significant bit portions of the first and second binary strings.

As illustrated above in connection with processes 400 and 470, process 550 may similarly be executed, at least in part, by a computing platform employing either a big endian or little endian processing architecture. In a particular embodiment employing a big endian processing architecture, portions $BS_1[i]$ and $BS_2[i]$ may merely comprise portions of the first and second binary strings in the same byte order as retrieved from memory. In a particular embodiment employing a little endian processing architecture, portions $BS_1[i]$ and $BS_2[i]$ may comprise bytes of the first and second binary strings in a byte order reversed according to how these bytes of the first and second strings are addressed in a memory storing the first and second strings.

According to an embodiment, an operator ">>m" may be used to indicate a dyadic and/or binary register operation on contents of an operand register having a result that may be stored in the same or different register. Here, a result of operator ">>m" may comprise shifting contents of an operand register from an MSB position toward an LSB position by m bits and propagating and/or copying a value of a sign bit and/or most significant bit of operand register to the m+1 most significant bits in the resulting register contents. If a most significant bit in a 64-bit register $Reg_x$ is "0" (indicating a 2's-complement expression of a non-negative quantity), for example, the expression $Reg_x >> 63$ may comprise all "0"s to bit locations of a resulting register. According to the aforementioned 2's-complement form of binary expressions, this is an expression of a quantity zero. Similarly, if a most significant bit in $Reg_x$ is "1" (indicating a 2's-complement expression of a negative quantity), for example, the expression $Reg_x >> 63$ may comprise all "1"s in bit locations of a register. According to the aforementioned 2's-complement form of binary expressions, this is an expression of a quantity negative one. Therefore, according to a particular embodiment, the expression $Reg_x\!>\!>\!63$ may provide a 2's-complement expression for a quantity zero if the contents of $Reg_x$ comprises a 2's-complement expression of zero or greater and may provide a 2's-complement expression for a quantity negative one if the contents of $Reg_x$ comprises a 2's-complement expression of less than zero.

According to an embodiment, although claimed subject matter is no limited in these respects, block 560 may determine a "sign" of the differences between portions of the first and second binary strings loaded to registers at block 558. Such a sign, in this particular embodiment, comprises an indication as to whether the contents of a register comprises a 2's-complement expression for a positive quantity, negative quantity or zero. For example, for the purposes of illustration, where $Reg_i$ comprises m-bit register, the expression $(Reg_i\!>\!>\!(m-1))-(-Reg_i\!>\!>\!(m-1))$ may provide an indication as to the sign of the contents of $Reg_i$ as a 2's-complement expression. Here, if the contents of $Reg_i$ comprises a positive quantity, the expression $(Reg_i\!>\!>\!(m-1))$ provides a 2's-complement expression for zero, the expression $(-Reg_i\!>\!>\!(m-1))$ provides a 2's-complement expression for negative one and $(Reg_i\!>\!>\!(m-1))-(-Reg_i\!>\!>\!(m-1))$ provides a 2's-complement expression for positive one. If the contents of $Reg_i$ comprises a negative quantity, the expression $(Reg_i\!>\!>\!(m-1))$ provides a 2's-complement expression for negative one, the expression $(-Reg_i\!>\!>\!(m-1))$ provides a 2's-complement expression for zero and $(Reg_i\!>\!>\!(m-1))-(-Reg_i\!>\!>\!(m-1))$ provides a 2's-complement expression for negative one. If the contents of $Reg_i$ comprises a zero quantity, the expression $(Reg_i\!>\!>\!(m-1))$ provides a 2's-complement expression for zero, the expression $(-Reg_i\!>\!>\!(m-1))$ provides a 2's-complement expression for zero and $(Reg_i\!>\!>\!(m-1))-(-Reg_i\!>\!>\!(m-1))$ provides a 2's-complement expression for zero.

As illustrated above, the differences between portions of the first and second binary strings may be stored in m-bit registers $Reg_0$ through $Reg_n$ at block 558. Block 560 may then determine the sign of the differences between the aforementioned portions of the first and second binary strings and update registers $Reg_0$ through $Reg_n$ accordingly as follows:

$$Reg_0 \leftarrow (Reg_0\!>\!>\!(m-1))-(-Reg_0\!>\!>\!(m-1))$$

$$Reg_1 \leftarrow (Reg_1\!>\!>\!(m-1))-(-Reg_1\!>\!>\!(m-1))$$

$$Reg_2 \leftarrow (Reg_2\!>\!>\!(m-1))-(-Reg_2\!>\!>\!(m-1))$$

$$\ldots$$

$$Reg_n \leftarrow (Reg_n\!>\!>\!(m-1))-(-Reg_n\!>\!>\!(m-1))$$

According to an embodiment, an operator "<<m" may be used to indicate a binary and/or dyadic shift operation on contents of an operand register by an m number of bits. Here, bits in an operand register may be shifted in a direction from the LSB toward the MSB (e.g., to the left according to a particular embodiment) by an m number of bits. The m least significant bit positions in the operand register are replaced with "0" and the m most significant bits are discarded. According to a particular embodiment, m may be limited by a number of bits in a register to prevent a shift of the least significant bit to a most significant bit in the resulting shifted expression. Here, such a shift may be limited to no more than the number of bits in a register minus one. Where the contents of a register $Reg_i$ comprise a 2's-complement expression for positive one, the expression $Reg_i\!<\!<\!m$ may provide an expression for a quantity $2^m$ as a 2's-complement expression. Similarly, where the contents of a register $Reg_i$ comprise a 2's-complement expression for negative one, the expression $Reg_i\!<\!<\!m$ may provide an expression for a quantity $-2^m$ as a 2's-complement expression. Lastly, where the contents of a register $Reg_i$ comprise a 2's-complement expression for zero, the expression $Reg_i\!<\!<\!m$ may provide an expression for a zero quantity as a 2's-complement expression.

As illustrated above in connection with a particular embodiment, block 558 may load differences between corresponding register sized portions of first and second binary strings to registers. According to an embodiment, although claimed subject matter is not limited in these respects, block 560 may determine a sign of the difference between respective most significant portions of the first and second binary strings. Block 560 may load the determined sign to $Reg_0$ as a 2's-complement expression for one if the difference is positive, negative one if the difference is negative and zero if the difference is zero. Block 560 may similarly determine a sign of the difference between respective least significant bit portions of the first and second binary strings, and load the determined sign to $Reg_n$ as a 2's-complement expression. Also, block 560 may determine the sign of the differences between bit portions of respective first and second binary strings in decreasing significance in registers $Reg_1$ to $Reg_{n-1}$.

According to an embodiment, block 562 may determine a weighed sum of the signs of differences between portions of first and second binary strings. In a particular example, although claimed subject matter is not limited in these respects, such a weighted sum may be used to determine whether the first quantity is greater than, less than or equal to the second quantity based. The sum of weighted signs of differences may be expressed as a 2's-complement binary expression. Here, if such a sum weighted differences comprises a 2's-complement binary expression for zero, the first and second quantities may be determined to be zero. Likewise, if such a sum comprises a 2's-complement binary expression for a positive quantity (e.g., MSB="0" and at least one other bit="1"), the second quantity may be determined to be greater than the first quantity. Lastly, if such a sum comprises a 2's-complement binary expression for a negative number (e.g., MSB="1"), the second quantity may be determined to be less than the first quantity.

In a particular embodiment, although claimed subject matter is not limited in these respects, block 562 may determine weighted components the sum of weighted signs of differences between corresponding register sized portions of first and second binary strings by applying the aforementioned shift operator "<<". Where $Reg_0$ stores a sign of difference between the most significant bit portions of the first and second binary strings and $Reg_n$ stores a sign of the difference between the least significant portions of the first and second binary strings, such a sum of weighted signs of differences may be determined as follows:

$$Sum \leftarrow (Reg_0\!<\!<\!n)+(Reg_1\!<\!<\!(n-1))+(Reg_2\!<\!<\!(n-2))+\ldots+(Reg_n\!<\!<\!0)$$

Accordingly, "Sum" comprises a 2's-complement expression of a quantity and/or value given by the following relation (5):

$$Sum = \sum_{i=0}^{n} 2^i * Reg_{n-i} \tag{5}$$

Storing a sign of the differences between least significant bit portions of the first and second binary strings, $Reg_n$ provides a component of the sum of weighted signs comprising contents of $Reg_n$ with no net shift from shift operator "<<."

Here, such a component of the sum based on the contents of register $Reg_n$ may comprise a 2's-complement expression of a quantity expressed by $Reg_n$ (e.g., zero, one or negative one depending on the sign of the difference between LSB portions of the first and second binary strings) multiplied by $2^0$ or one. On the other hand, register $Reg_0$, storing a sign of the differences between most significant bit portions of the first and second binary strings, provides a component of the sum of weighted signs comprising contents of $Reg_0$ with a net shift of n bits. Here, such a component may comprise a 2's-complementary expression of $Reg_0$ multiplied by $2^n$.

Techniques for performing table look ups are well-known and well-understood. Thus, this will not be discussed in detail here. However, it shall be appreciated that any and all of the previously described and/or later described processing, operations, conversions, transformations, manipulations, etc. of strings, symbols, characters, numerals, data, etc. may be performed on one or more computing platforms or similar computing devices, such as those that may include a memory to store tables although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover all such embodiments.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method comprising:
    receiving from a network a data stream comprising one or more data character expressions;
    concatenating binary expressions associated with individual characters of at least one of said one or more data character expressions in one or more data binary strings, said at least one data character expressions representing a numerical value of a numerical expression, the numerical expression comprising a concatenation of said individual characters, each of said individual characters representing a digit value at an associated position in the numerical expression, said digit value having exactly one of three or more possible unique values, said numerical value comprising a sum of products, each of said products comprising one of said digit values multiplied by a positional value associated with a position of said digit value in the numerical expression; and
    processing a query of information in said data stream based, at least in part, on an application of an operator to at least one of said one or more data binary strings to provide a comparison of said numerical value of said numerical expression represented by said concatenation of individual characters of said at least one of said one or more character expressions with a numerical value represented by one or more query character expressions of said query.

2. The method of claim 1, wherein said processing said query further comprises:
    concatenating binary expressions associated with individual characters of at least one of said one or more query character expressions in one or more query binary strings; and
    determining a quantitative relationship between said numerical value of said numerical expression comprising said concatenation of individual characters of said at least one of said data character expressions and said one or more query character expressions based, at least in part, on said one or more data binary strings and said one or more query binary strings.

3. The method of claim 2, wherein said query further comprises a query operator, and wherein said determining said quantitative relationship further comprises determining said quantitative relationship according to said query operator.

4. The method of claim 3, wherein said determining said quantitative relationship further comprises determining whether said numerical value comprising said concatenation of individual characters of said at least one of said data character expressions is greater than a numerical value of a numerical expression represented by a concatenation of individual characters of said at least one of said query character expressions according to said non-binary position-value notation.

5. The method of claim 3, wherein said determining said quantitative relationship further comprises determining whether said numerical value represented by said at least one of said data character expressions is less than a numerical value of a numerical expression represented by a concatenation of individual characters of said at least one of said query character expressions according to said non-binary position-value notation.

6. The method of claim 1, wherein said data stream comprises character expressions from a plurality of data sources.

7. The method of claim 1, and further comprising buffering at least a portion of said one or more data stream binary strings in a window buffer, and wherein said processing said query further comprises processing said query based, at least in part on information maintained in said window buffer.

8. The method of claim 7, wherein said buffering said portion of said one or more data stream binary streams further comprises merging said portion with historical data.

9. The method of claim 7, wherein said buffering said portion further comprises:
   expiring at least a portion of said historical data; and
   merging a previously presented portion of said portion of said one or more data streams with an unexpired portion of said historical data to provide an updated window buffer.

10. The method of claim 9, wherein said processing said query further comprises processing said query based, at least in part, on said updated window buffer.

11. The method of claim 1, wherein said one or more data character expressions comprise information representing events.

12. A method comprising:
   obtaining a query comprising one or more query character expressions; and
   processing said query based, at least in part, on an application of an operator to a query binary string comprising a concatenation of one or more binary expressions associated with individual characters of at least one of said query character expressions to provide a comparison of a first numerical value associated with a data stream with a second numerical value of a numerical expression, the numerical expression comprising a concatenation of said individual characters, each of said individual characters representing a digit value at an associated position in the numerical expression, said digit value having exactly one of three or more possible unique values, said second numerical value comprising a sum of products, each of said products comprising one of said digit values multiplied by a positional value associated with a position of said digit value in the numerical expression.

13. The method of claim 12, and further comprising:
   storing data comprising one or more data character expressions; and
   concatenating binary expressions associated with of individual characters of at least one of said character expressions in one or more data binary strings, and wherein said processing said query further comprises processing said query based, at least in part, on said query binary strings and said one or more data binary strings.

14. The method of claim 12, wherein said query further comprises a query operator, and wherein said processing said query further comprises determining a quantitative relationship between said one or more query character expressions and information represented by at least one data character expression.

15. The method of claim 14, wherein said determining said relationship further comprises determining said quantitative relationship based, at least in part, on said query binary string and a binary string representing a concatenation of characters in said at least one data character expression.

16. The method of claim 14, wherein said query further comprises an identifier associated with a data binary string representing a concatenation of individual characters of the at least one data character expression.

17. The method of claim 16, wherein said query character expression represents a first quantity and said at least one data character expression represents a second quantity, and wherein said processing said query further comprises determining whether said first quantity is greater than said second quantity.

18. The method of claim 16, wherein said query character expression represents a first quantity and said at least one data character expression represents a second quantity, and wherein said processing said query further comprises determining whether said first quantity is less than said second quantity.

19. The method of claim 16, wherein said query character expression represents a first quantity and said at least one data character expression represents a second quantity, and wherein said processing said query further comprises determining whether said first quantity is equal to said second quantity.

20. An apparatus comprising:
   means for obtaining one or more data character expressions from a data stream;
   means for concatenating binary expressions associated with individual characters of at least one of said one or more data character expressions in one or more data binary strings, said at least one of said one or more data character expressions representing a numerical value of a numerical expression, the numerical expression comprising a concatenation of said individual characters, each of said individual characters representing a digit value at an associated position in the numerical expression, said digit value having exactly one of three or more possible unique values, said numerical value comprising a sum of products, each of said products comprising one of said digit values multiplied by a positional value associated with a position of said digit value in the numerical expression; and
   means for processing a query of information in said data stream based, at least in part, on an application of an operator to at least one of said one or more data binary strings to provide a comparison of said numerical value of said numerical expression represented by said concatenation of said individual characters with a numerical value represented by one or more query character expressions.

21. The apparatus of claim 20, wherein said means for processing said query further comprises:
   means for concatenating binary expressions associated with individual characters of at least one of said one or more query character expressions in one or more query binary strings; and
   means for determining a quantitative relationship between said numerical value of said numerical expression comprising said concatenation of individual characters of said at least one of said data character expressions and said numerical value represented by said one or more query character expressions based, at least in part, on said one or more data binary strings and said one or more query binary strings.

22. The apparatus of claim 21, wherein said query further comprises a query operator, and wherein said means for determining said quantitative relationship further comprises means for determining said quantitative relationship according to said query operator.

23. The apparatus of claim 22, wherein said means for determining said quantitative relationship further comprises means for determining whether said numerical value of said numerical expression comprising said concatenation of said characters of said at least one of said data character expressions is greater than a numerical value of a numerical expression comprising a concatenation of individual characters of said at least one of said query character expressions.

24. The apparatus of claim 22, wherein said means for determining said quantitative relationship further comprises means for determining whether said numerical value of said numerical expression comprising said concatenation of said characters of said at least one of said data character expressions is less than a numerical value of a numerical expression comprising a concatenation of individual characters of said at least one of said query character expressions.

25. The apparatus of claim 21, wherein said data stream comprises character expressions from a plurality of data sources.

26. The apparatus of claim 21, and further comprising means for buffering at least a portion of said one or more data stream binary strings in a window buffer, and wherein said means for processing said query further comprises means for processing said query based, at least in part on information maintained in said window buffer.

27. The apparatus of claim 26, wherein said means for buffering said portion of said one or more data stream binary streams further comprises means for merging said portion with historical data.

28. The apparatus of claim 26, wherein said means for buffering said portion further comprises:
   means for expiring at least a portion of said historical data; and
   means for merging a previously presented portion of said portion of said one or more data streams with an unexpired portion of said historical data to provide an updated window buffer.

29. The apparatus of claim 28, wherein said means for processing said query further comprises means for processing said query based, at least in part, on said updated window buffer.

30. The apparatus of claim 20, wherein said one or more data character expressions comprise information representing events.

31. An apparatus comprising:
   means for obtaining a query comprising one or more query character expressions; and
   means for processing said query based, at least in part, on an application of an operator to a query binary string comprising a concatenation of one or more binary expressions associated with individual characters of at least one of said query character expressions to provide a comparison of a first numerical value associated with a data stream with a second numerical value of a numerical expression, the numerical expression comprising a concatenation of said individual characters, each of said individual characters representing a digit value at an associated position in the numerical expression, said digit value having exactly one of three or more possible unique values, said second numerical value comprising a sum of products, each of said products comprising one of said digital values multiplied by a position value associated with a position of said digit value in the numerical expression.

32. The apparatus of claim 31, and further comprising:
   means for storing data comprising one or more data character expressions; and
   means for concatenating binary expressions associated with of individual characters of at least one of said character expressions in one or more data binary strings, and wherein said processing said query further comprises processing said query based, at least in part, on said query binary strings and said one or more data binary strings.

33. The apparatus of claim 31, wherein said query further comprises a query operator, and wherein said means for processing said query further comprises means for determining a quantitative relationship between said one or more query character expressions and information represented by at least one data character expression.

34. The apparatus of claim 33, wherein said means for determining said quantitative relationship further comprises means for determining said quantitative relationship based, at least in part, on said query binary string and a binary string representing a concatenation of characters in said at least one data character expression.

35. The apparatus of claim 33, wherein said query further comprises an identifier associated with a data binary string representing a concatenation of individual characters of the at least one data character expression.

36. The apparatus of claim 35, wherein said query character expression represents a first quantity and said at least one data character expression represents a second quantity, and wherein said means for processing said query further comprises means for determining whether said first quantity is greater than said second quantity.

37. The apparatus of claim 35, wherein said query character expression represents a first quantity and said at least one data character expression represents a second quantity, and wherein said means for processing said query further comprises means for determining whether said first quantity is less than said second quantity.

38. The apparatus of claim 35, wherein said query character expression represents a first quantity and said at least one data character expression represents a second quantity, and wherein said means for processing said query further comprises means for determining whether said first quantity is equal to said second quantity.

39. An apparatus comprising:
   a computing platform, said computing platform being adapted to:
      obtain one or more data character expressions from a data stream;
      concatenate binary expressions associated with individual characters of at least one of said one or more data character expressions in one or more data binary strings, said at least one of said one or more data character expressions representing a numerical value of a numerical expression, the numerical expression comprising a concatenation of said individual characters, each of said individual characters representing a digit value at an associated position in the numerical expression, said digit value having exactly one of three or more possible unique values, said numerical value comprising a sum of products, each of said products comprising one of said digit values multiplied by a positional value associated with a position of said digit value in the numerical expression; and
      process a query of information in said data stream based, at least in part, on an application of an operator to at least one of said one or more data binary strings to provide a comparison of said numerical value of said numerical expression represented by said concatenation of said individual characters of said at least one of said one or more character expressions with a numerical value represented by one or more query character expressions of said query.

40. The apparatus of claim 39, wherein said computing platform is further adapted to process said query by:
- concatenating binary expressions associated with individual characters of at least one of said one or more query character expressions in one or more query binary strings; and
- determining a quantitative relationship between said numerical value of said numerical expression comprising said concatenation of said individual characters of said at least one of said data character expressions and a numerical value of a numerical expression comprising a concatenation of individual characters of said one or more query character expressions, at least in part, on said one or more data binary strings and said one or more query binary strings.

41. The apparatus of claim 40, wherein said query further comprises a query operator, and wherein said computing platform is further adapted to determine said quantitative relationship according to said query operator.

42. The apparatus of claim 41, wherein said computing platform is further adapted to determine whether said numerical value of said numerical expression comprising said concatenation of individual characters of said at least one of said data character expressions is greater than a numerical value of a numerical expression comprising a concatenation of individual characters of said at least one of said query character expressions.

43. The apparatus of claim 41, wherein said computing platform is further adapted to determine whether said numerical value of said numerical expression comprising said concatenation of individual characters of said at least one of said data character expressions is less than a numerical value of a numerical expression comprising a concatenation of individual characters of said at least one of said query character expressions.

44. The apparatus of claim 39, wherein said data stream comprises character expressions from a plurality of data sources.

45. The apparatus of claim 39, wherein said computing platform is further adapted to:
- buffer at least a portion of said one or more data stream binary strings in a window buffer; and
- process said query based, at least in part on information maintained in said window buffer.

46. The apparatus of claim 45, wherein said computing platform is further adapted to merge said portion of said one or more data stream binary streams with historical data.

47. The apparatus of claim 45, wherein said computing platform is further adapted to:
- expire at least a portion of said historical data; and
- merge a previously presented portion of said portion of said one or more data streams with an unexpired portion of said historical data to provide an updated window buffer.

48. The apparatus of claim 47, wherein said computing platform is further adapted to process said query based, at least in part, on said updated window buffer.

49. The apparatus of claim 39, wherein said one or more data character expressions comprise information representing events.

50. An apparatus comprising:
a computing platform, said computing platform being adapted to:
- obtain a query comprising one or more query character expressions; and
- process said query based, at least in part, on an application of an operator to a query binary string comprising a concatenation of one or more binary expressions associated with individual characters of at least one of said query character expressions to provide a comparison of a first numerical value associated with a data stream with a second numerical value of a numerical expression, the numerical expression comprising a concatenation of said individual characters, each of said individual characters representing a digit value at an associated position in the numerical expression, said digit value having exactly one of three or more possible unique values, said second numerical value comprising a sum of products, each of said products comprising one of said digit values multiplied by a positional value associated with a position of said digit value in the numerical expression.

51. The apparatus of claim 50, wherein said computing platform is further adapted to:
- store data comprising one or more data character expressions;
- concatenate binary expressions associated with of individual characters of at least one of said character expressions in one or more data binary strings; and
- process said query by processing said query based, at least in part, on said query binary strings and said one or more data binary strings.

52. The apparatus of claim 50, wherein said query further comprises a query operator, and wherein said computing platform is further adapted to determine a quantitative relationship between said one or more query character expressions, and information represented by at least one data character expression.

53. The apparatus of claim 52, wherein said computing platform is further adapted to determine said relationship based, at least in part, on said query binary string and a binary string representing a concatenation of characters in said at least one data character expression.

54. The apparatus of claim 52, wherein said query further comprises an identifier associated with a data binary string comprising a concatenation of individual characters of the at least one data character expression.

55. The apparatus of claim 54, wherein said query character expression represents a first quantity and said at least one data character expression represents a second quantity, and wherein said computing platform is further adapted to determine whether said first quantity is greater than said second quantity.

56. The apparatus of claim 54, wherein said query character expression represents a first quantity and said at least one data character expression represents a second quantity, and wherein said computing platform is further adapted to determine whether said first quantity is less than said second quantity.

57. The apparatus of claim 54, wherein said query character expression represents a first quantity and said at least one data character expression represents a second quantity, and wherein said computing platform is further adapted to determine whether said first quantity is equal to said second quantity.

58. An article comprising:
a storage medium comprising machine-readable instructions stored thereon which are executable by a computing platform to:
- obtain one or more data character expressions from a data stream;
- concatenate binary expressions associated with individual characters of at least one of said one or more data character expressions in one or more data binary strings, said at least one of said one or more data character expressions representing a numerical value of a numerical expression, the numerical expression comprising a concatenation of said individual characters, each of said individual characters representing a digit value at an associated position in the numerical expression, said digit value having exactly one of three or more possible unique values, said numerical value comprising a sum of products, each of said products comprising one of said digital values multiplied by a positional value associated with a position of said digital value in the numerical expression; and process a query of information in said data stream based, at least in part, on an application of an operator to at least one of said one or more data binary strings to provide a comparison of said numerical value of said numerical expression represented by said concatenation of said individual characters of said at least one of said one or more character expressions with a numerical value represented by one or more query character expressions of said query.

59. The article of claim 58, wherein said machine-readable instructions are further executable by said computing platform to:
concatenate binary expressions associated with individual characters of at least one of said one or more query character expressions in one or more query binary strings; and
determine a quantitative relationship between said numerical value of said numerical expression comprising said concatenation of individual characters of said at least one of said data character expressions and a numerical value of a numerical expression comprising a concatenation of individual characters of said one or more query character expressions based, at least in part, on said one or more data binary strings and said one or more query binary strings.

60. The article of claim 59, wherein said query further comprises a query operator, and wherein said instructions are further executable by said computing platform to determine said quantitative relationship by determining said quantitative relationship according to said query operator.

61. The article of claim 60, wherein said instructions are further executable by said computing platform to determine said quantitative relationship by determining whether said numerical value of said numerical expression comprising said concatenation of said individual characters of said at least one of said data character expressions is greater than said numerical value of said numerical expression comprising said concatenation of said individual characters of said at least one of said query character expressions.

62. The article of claim 60, wherein said instructions are further executable by said computing platform to determine said quantitative relationship by determining whether said numerical value of said numerical expression comprising said concatenation of individual characters of said at least one of said data character expressions is less than said numerical value of said numerical expression comprising said concatenation of said individual characters of said at least one of said query character expressions.

63. The article of claim 58, wherein said data stream comprises character expressions from a plurality of data sources.

64. The article of claim 58, wherein said machine-readable instructions are further executable by said computing platform to:
buffer at least a portion of said one or more data stream binary strings in a window buffer; and
process said query by processing said query based, at least in part on information maintained in said window buffer.

65. The article of claim 64, wherein said instructions are further executable by computing platform to buffer said portion of said one or more data stream binary streams by merging said portion with historical data.

66. The article of claim 65, wherein said instructions are further executable by said computing platform to buffer said portion by:
expiring at least a portion of said historical data; and
merging a previously presented portion of said portion of said one or more data streams with an unexpired portion of said historical data to provide an updated window buffer.

67. The article of claim 66, wherein said instructions are further executable by said computing platform to process said query based, at least in part, on said updated window buffer.

68. The article of claim 58, wherein said one or more data character expressions comprise information representing events.

69. An article comprising:
a storage medium comprising machine-readable instructions stored thereon
which are executable by a computing platform to:
obtain a query comprising one or more query character expressions; and
process said query based, at least in part, on an application of an operator to a query binary string comprising a concatenation of one or more binary expressions associated with individual characters of at least one of said query character expressions to provide a comparison of a first numerical value associated with a data stream with a second numerical value of a numerical expression, the numerical expression comprising a concatenation of said individual characters, each of said individual characters representing a digit value at an associated position in the numerical expression, said digit value having exactly one of three or more possible unique values, said second numerical value comprising a sum of products, each of said products comprising one of said digit values multiplied by a positional value associated with a position of said digit value in the numerical expression.

70. The article of claim 69, wherein said machine-readable instructions are further executable by said computing platform to:
store data comprising one or more data character expressions; and
concatenate binary expressions associated with of individual characters of at least one of said character expressions in one or more data binary strings; and
process said query based, at least in part, on said query binary strings and said one or more data binary strings.

71. The article of claim 69, wherein said query further comprises a query operator, and wherein said instructions are further executable by said computing platform to process said query by determining a quantitative relationship between said one or more query character expressions and information represented by at least one data character expression.

72. The article of claim 71, wherein said instructions are further executable by said computing platform to determine said relationship by determining said quantitative relationship based, at least in part, on said query binary string and a binary string representing a concatenation of characters in said at least one data character expression.

73. The article of claim 71, wherein said query further comprises an identifier associated with a data binary string comprising a concatenation of individual characters of the at least one data character expression.

74. The article of claim 73, wherein said query character expression represents a first quantity and said at least one data character expression represents a second quantity, and wherein said instructions are further executable by said computing platform to process said query by determining whether said first quantity is greater than said second quantity.

75. The article of claim 73, wherein said query character expression represents a first quantity and said at least one data character expression represents a second quantity, and wherein said instructions are further executable by said computing platform to process said query by determining whether said first quantity is less than said second quantity.

76. The article of claim 73, wherein said query character expression represents a first quantity and said at least one data character expression represents a second quantity, and wherein said instructions are further executable by said computing platform to process said query by determining whether said first quantity is equal to said second quantity.

77. The method of claim 1, wherein said numerical expression expresses said numerical value according to a base ten notation.

* * * * *